United States Patent
Siu et al.

(10) Patent No.: US 9,244,731 B2
(45) Date of Patent: Jan. 26, 2016

(54) MIGRATION MANAGEMENT APPARATUS AND MIGRATION MANAGEMENT METHOD

(71) Applicant: Fujitsu Limited, Kawasaki-shi, Kanagawa (JP)

(72) Inventors: Dich Tan Dixon Siu, Setagaya (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 14/031,410

(22) Filed: Sep. 19, 2013

(65) Prior Publication Data

US 2014/0019974 A1 Jan. 16, 2014

Related U.S. Application Data

(63) Continuation of application No. PCT/JP2011/056851, filed on Mar. 22, 2011.

(51) Int. Cl.
G06F 9/455 (2006.01)
G06F 9/48 (2006.01)
G06F 9/50 (2006.01)

(52) U.S. Cl.
CPC .......... *G06F 9/4856* (2013.01); *G06F 9/45558* (2013.01); *G06F 9/5072* (2013.01); *G06F 2009/4557* (2013.01)

(58) Field of Classification Search
CPC .......... G06F 9/50; G06F 9/46; G06F 9/5077; G06F 9/4856; G06F 9/455
See application file for complete search history.

(56) References Cited

U.S. PATENT DOCUMENTS

| 8,141,075 | B1* | 3/2012 | Chawla et al. | 718/1 |
| 2008/0196026 | A1 | 8/2008 | Azagury et al. | |
| 2009/0089781 | A1* | 4/2009 | Shingai et al. | G06F 9/5088 718/1 |
| 2009/0119087 | A1 | 5/2009 | Ang et al. | |
| 2010/0250744 | A1* | 9/2010 | Hadad et al. | 709/226 |

(Continued)

FOREIGN PATENT DOCUMENTS

| JP | 2007-536657 | 12/2007 |
| JP | 2008-217302 | 9/2008 |
| JP | 2010-117760 | 5/2010 |

(Continued)

OTHER PUBLICATIONS

English language International Search Report for PCT/JP2011/056851, mailed Jun. 28, 2011, 2 pages.

(Continued)

*Primary Examiner* — Meng An
*Assistant Examiner* — James J Lee
(74) *Attorney, Agent, or Firm* — Staas & Halsey LLP

(57) ABSTRACT

A migration management apparatus includes a first decision unit, a second decision unit, and a migration processing unit. The first decision unit simulates the migration of each virtual machine being a migration target to decide a migration destination. The second decision unit decides a migration mode of the virtual machine whose migration destination has been decided by the first decision unit based on the power status of the virtual machine. The migration processing unit, upon the migration destinations and migration modes of the virtual machines being the migration targets having been decided, migrates the virtual machines to the respective migration destinations decided by the first decision unit in the respective migration modes decided by the second decision unit.

9 Claims, 25 Drawing Sheets

(56) References Cited

U.S. PATENT DOCUMENTS

2010/0325634 A1 12/2010 Ichikawa et al.
2011/0231839 A1* 9/2011 Bennett et al. ........ G06F 9/5055
　　　　　　　　　　　　　　　　　　　　　　　　718/1

FOREIGN PATENT DOCUMENTS

| JP | 2010-244524 | 10/2010 |
| JP | 2011-008780 | 1/2011 |
| WO | WO 2005/109195 A2 | 11/2005 |
| WO | WO 2008/102739 A1 | 8/2008 |

OTHER PUBLICATIONS

Japanese Office Action dated Dec. 2, 2014 in corresponding Japanese Patent Application No. 2013-505703.

* cited by examiner

| array_index | ID | NAME |
|---|---|---|
| 0 | 1 | Host_a |
| 1 | 2 | Host_b |
| 2 | 3 | Host_c |
| 3 | 4 | Host_d |
| 4 | 5 | Host_e |
| 5 | 6 | Host_f |
| 6 | 7 | Host_g |
| 7 | 8 | Host_h |
| 8 | 9 | Host_i |
| 9 | 10 | Host_j | s1

| Hash_key | array_index | ID | NAME |
|---|---|---|---|
| 2 | 0 | 21 | Guest_b1 |
| | 1 | 22 | Guest_b2 |
| | 2 | 23 | Guest_b3 |
| 3 | 0 | 25 | Guest_c1 |
| | 1 | 27 | Guest_c3 |
| 8 | 0 | 28 | Guest_i1 | s2

| Hash_key | array_index | ID | NAME |
|---|---|---|---|
| 2 | 0 | 21 | Guest_b1 |
| | 1 | 22 | Guest_b2 |
| | 2 | 23 | Guest_b3 |
| 3 | 0 | 25 | Guest_c1 |
| 8 | 0 | 28 | Guest_i1 |

FIG.5 s3

| Hash_key | array_index | ID | NAME |
|---|---|---|---|
| 3 | 0 | 1 | Host_a |
|  | 1 | 4 | Host_b |
|  | 2 | 5 | Host_c |

⇩ s4

| Hash_key | array_index | ID | NAME |
|---|---|---|---|
| 3 | 0 | 1 | Host_a |
|  | 1 | 4 | Host_b |
|  | 2 | 5 | Host_c |
| 2 | 0 | 6 | Host_f |
|  | 1 | 7 | Host_g |

FIG.6

| Hash_key | array_index | ID | migration_type |
|---|---|---|---|
| 7 | 0 | 22 | cold |
|  | 1 | 23 | live |
| 1 | 0 | 25 | live |

FIG.7

| ID | NAME | api_type | virtual_machines | logical_server_id (SV) |
|---|---|---|---|---|
| 1 | Host_a | API (A) | (OMITTED) | 1 |
| 2 | Host_b | API (B) | VM 101 TO VM 104 | 2 |
| 3 | Host_c | API (A) | VM 105 TO VM 107 | 3 |
| 4 | Host_d | API (A) | (OMITTED) | 4 |
| 5 | Host_e | API (A) | (OMITTED) | 5 |
| 6 | Host_f | API (B) | (OMITTED) | 6 |
| 7 | Host_g | API (B) | (OMITTED) | 7 |
| 8 | Host_h | API (C) | (OMITTED) | 8 |
| 9 | Host_i | API (D) | (OMITTED) | 9 |
| 10 | Host_j | API (C) | (OMITTED) | 10 |

FIG.8

| ID | os_instance | power_status | vm_host_id | MEMORY CAPACITY | NUMBER OF CPUs | CPU SPECIFICATION |
|---|---|---|---|---|---|---|
| 101 | Guest_b1 | on | 2 | 1 GB | 2 | 1.2 GHz |
| 102 | Guest_b2 | off | 2 | 750 MB | 2 | 3 GHz |
| 103 | Guest_b3 | on | 2 | 256 MB | 2 | 1.2 GHz |
| 104 | Guest_b4 | unknown | 2 | 1 GB | 3 | 2.8 GHz |
| 105 | Guest_c1 | on | 3 | 700 MB | 3 | 1.2 GHz |
| 106 | Guest_c2 | unknown | 3 | 1 GB | 3 | 2 GHz |
| 107 | Guest_c3 | on | 3 | 1 GB | 1 | 1.2 GHz |
| 108 | Guest_h1 | on | 8 | 1 GB | 1 | 1.2 GHz |

FIG.9

| ID | NAME | logical_server_id (VM) |
|---|---|---|
| 21 | Guest_b1 | 101 |
| 22 | Guest_b2 | 102 |
| 23 | Guest_b3 | 103 |
| 24 | Guest_b4 | 104 |
| 25 | Guest_c1 | 105 |
| 26 | Guest_c2 | 106 |
| 27 | Guest_c3 | 107 |
| 28 | Guest_h1 | 108 |

FIG.10

| ID | os_instance | vm_managings |
|---|---|---|
| 1 | Host_a | AP1, AP2, AP4 |
| 2 | Host_b | [OMITTED] |
| 3 | Host_c | [OMITTED] |
| 4 | Host_d | [OMITTED] |
| 5 | Host_e | [OMITTED] |
| 6 | Host_f | [OMITTED] |
| 7 | Host_g | [OMITTED] |
| 8 | Host_h | [OMITTED] |
| 9 | Host_i | [OMITTED] |
| 10 | Host_j | [OMITTED] |

FIG.11

| ID | management_software_id | logical_server_id (SV) |
|---|---|---|
| 1 | 1 | 8 |
| 2 | 1 | 10 |
| 3 | 2 | 9 |

FIG.12

| ID | managings |
|---|---|
| 1 | Managing1, Managing3 |
| 2 | Managing2 |

MIGRATION MANAGEMENT APPARATUS AND MIGRATION MANAGEMENT METHOD

CROSS-REFERENCE TO RELATED APPLICATION

This application is a continuation of International Application No. PCT/JP2011/056851, filed on Mar. 22, 2011 and designating the U.S., the entire contents of which are incorporated herein by reference.

FIELD

The present invention relates to a migration apparatus and a migration management method.

BACKGROUND

Conventionally, a large-scale system as in a distributed computer system such as a large-scale data center changes hardware in charge of processing, in other words, migrates a process to different hardware to increase the availability of the system. As an example, a technology for running a VM (Virtual Machine) host on hardware and running a VM guest on the VM host is known.

The VM host is a program that virtually realizes the operating environment of a computer system. The VM guest runs as a virtual machine in an environment provided by the VM host, and takes a process to be provided to a user. The VM guest can continue the process even if it is migrated to a different VM host.

Used as a technology for migrating a VM guest to a different VM host in this manner is migration such as live migration that migrates the VM guest without stopping its operation and cold migration that migrates the VM guest after stopping its operation. Migration is used, not limited for the VM guest but also when the VM host is migrated to another physical server.

For example, a technology has conventionally been used in which GUI (Graphical User Interface), CLI (Command line interface), Script, or the like is used to specify a migration destination VM host and migrate migration target VM guests one at a time.

In recent years, a technology for executing an automatic migration is also known. For example, a technology is known in which virtual software on a server to which a VM guest may migrate is identified based on the CPU usage rates, memory usage amounts, duration of migrations of servers targeted as migration destinations of the VM guest, and the migration target VM guest is live-migrated to the identified virtual software.

Moreover, a technology is also known in which scheduling is performed based on the load cycle of a virtual machine system on which a VM host and a VM guest run, and live migration is automatically executed in accordance with the schedule.

With regard to the conventional technologies, see Japanese Laid-open Patent Publication No. 2008-217302, Japanese Laid-open Patent Publication No. 2010-117760, and Japanese National Publication of International Patent Application No. 2007-536657, for example.

However, if a plurality of virtual machines is migration targets in the conventional technology, the virtual machines are migrated one at a time and the completion of the migration of each virtual machine is confirmed. Therefore, there are problems that the work of a manager who manages a migration process of the virtual machines becomes complicated, and the time to bind the manager is long.

For example, a technology using a GUI, a command and the like specifies a migration destination VM host, executes live migration, and confirms whether or not live migration has ended normally, for each migration target VM guest. In other words, live migration is not able to be successively executed. Hence, the manager is to be bound until migrations of all VM guests are completed normally.

Moreover, if live migration is automated in accordance with a schedule and the like, when a migration target VM guest is being suspended, live migration results in an abnormal termination. As a consequence, a process may end without migrating a VM guest that is desired to be migrated. In other words, also in the case of automatic execution, the manager confirms a normal termination after the automatic execution and the manager is consequently to be bound from after the execution to the confirmation of a normal termination. Therefore, even if the technology is used, the working time of the manager is not short.

SUMMARY

According to one aspect of an embodiment of the invention, a migration management apparatus includes a first decision unit that simulates the migration of each virtual machine being a migration target to decide a migration destination. The migration management apparatus includes a second decision unit that decides a migration mode of the virtual machine whose migration destination has been decided by the first decision unit based on the power status of the virtual machine. The migration management apparatus includes a migration processing unit that, upon the migration destinations and migration modes of the virtual machines being the migration targets having been decided, migrates the virtual machines to the respective migration destinations decided by the first decision unit in the respective migration modes decided by the second decision unit.

According to another aspect of an embodiment of the invention, migration management method is a control method to be executed by a computer, and includes:

simulating the migration of each virtual machine being a migration target to decide a migration destination; deciding a migration mode of the virtual machine whose migration destination has been decided based on the power status of the virtual machine; and upon the migration destinations and migration modes of the virtual machines being the migration targets having been decided, migrating the virtual machines to the respective decided migration destinations in the respective decided migration modes.

According to still another aspect of an embodiment of the invention, a computer-readable recording medium has stored therein a migration management program to cause a computer to execute a process. The process includes: simulating the migration of each virtual machine being a migration target to decide a migration destination; deciding a migration mode of the virtual machine whose migration destination has been decided based on the power status of the virtual machine; and upon the migration destinations and migration modes of the virtual machines being the migration targets having been decided, migrating the virtual machines to the respective decided migration destinations in the respective decided migration modes.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating an example of a dst_vm_hosts variable stored in the variable management table;

FIG. 6 is a diagram illustrating an example of a migration_lists variable stored in the variable management table;

FIG. 7 is a diagram illustrating examples of information stored in a VM host table;

FIG. 8 is a diagram illustrating examples of information stored in a VM table;

FIG. 9 is a diagram illustrating examples of information stored in a VM guest table;

FIG. 10 is a diagram illustrating examples of information stored in a server profile table;

FIG. 11 is a diagram illustrating examples of information stored in a VM management table;

FIG. 12 is a diagram illustrating examples of information stored in a management software table;

DESCRIPTION OF EMBODIMENTS

Preferred embodiments of the present invention will be explained with reference to accompanying drawings.

In addition, the embodiments do not limit the technique disclosed herein.

[A] First Embodiment

Figure 1:
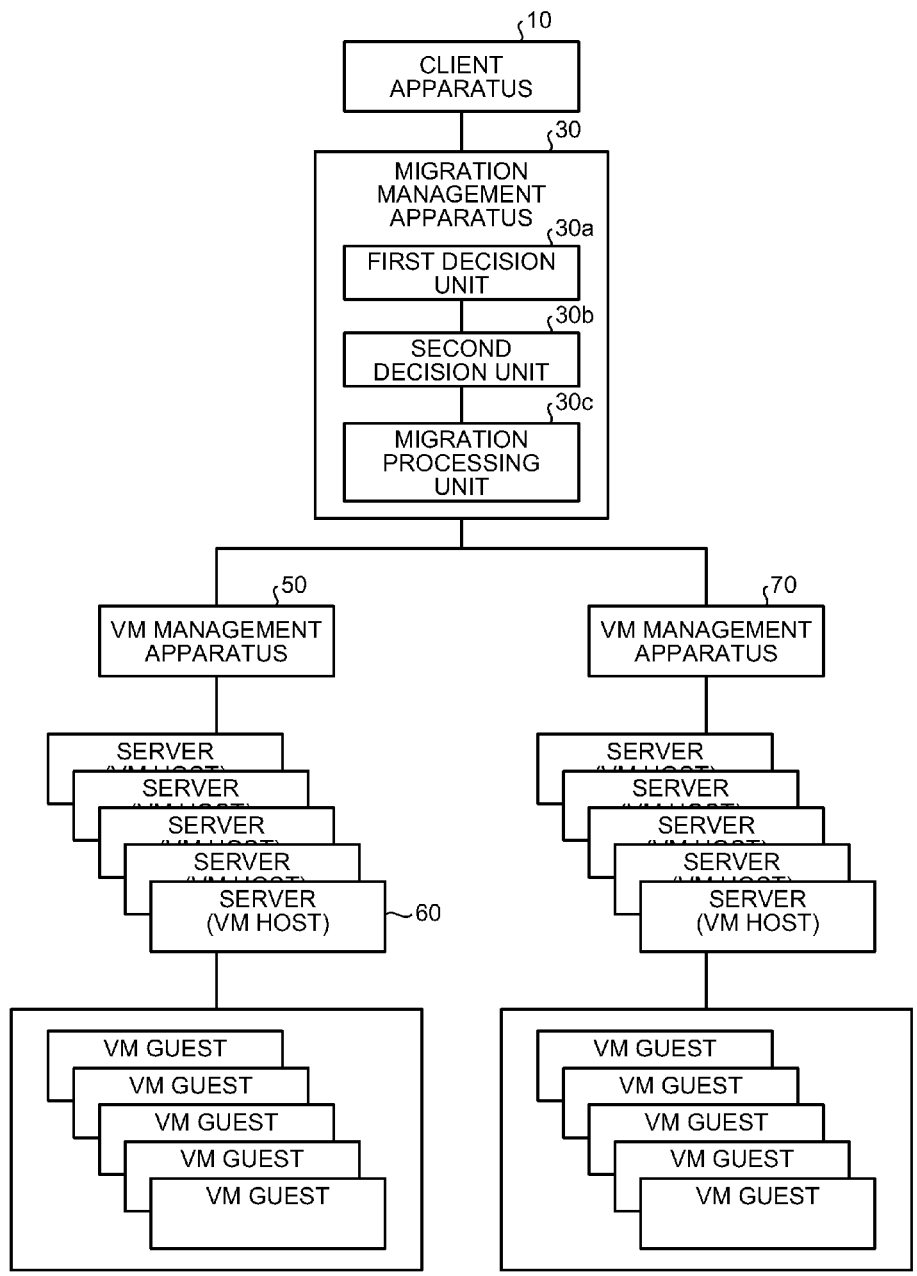
FIG. 1 is a diagram illustrating an entire configuration of a system including a migration management apparatus according to a first embodiment.

FIG. 1 is a diagram illustrating an entire configuration of a system including a migration management apparatus according to a first embodiment. As illustrated in FIG. 1, the system includes a client apparatus 10, a migration management apparatus 30, a VM (Virtual Machine) management apparatus 50, a VM management apparatus 70, and a plurality of servers (VM hosts) 60. The numbers of the servers and apparatuses illustrated in FIG. 1 are merely illustration, and the numbers are not limited to them. An arbitrary number of the servers and apparatuses can be set.

The client apparatus 10 is a computer used by a manager and a user of the system, transmits an instruction to migrate VM guests to the migration management apparatus 30, and causes the migration management apparatus 30 to execute the migrations of the VM guests.

The migration management apparatus 30 includes a first decision unit 30a, a second decision unit 30b, and a migration processing unit 30c, receives from the client apparatus 10 the instruction to migrate the VM guests, and requests the VM management apparatus 50 and the VM management apparatus 70 to execute the migrations of the VM guests.

The VM management apparatus 50 and the VM management apparatus 70 are servers that store information on a VM host running on a physical server and on a VM guest running on the VM host, and the like, and that manage all virtual machines. For example, the VM management apparatus 50 and the VM management apparatus 70 store information on a VM host, such as the resource statuses of the VM host and a VM guest and a maximum number of VM guests that may run on the VM host.

The server 60 is a physical server that executes a VM host being a program that virtually realizes the operating environment of another computer system where a VM guest being a virtual machine runs. The VM guest is a virtual machine that takes a process to be provided to the user in an environment provided by the VM host.

In such a situation, the first decision unit 30a of the migration management apparatus 30 simulates the migrations of VM guests being migration targets and decides their respective migration destination VM hosts. Next, the second decision unit 30b decides the migration modes of VM guests whose migration destination VM hosts have been decided, based on the power statuses of the VM guests. Subsequently, when the migration destinations and the migration modes are decided for the respective VM guests being the migration targets, the migration processing unit 30c migrates the VM guests in one batch to their respective migration destinations decided by the first decision unit 30a in their respective migration modes decided by the second decision unit 30b.

In this manner, whether or not a migration to the VM host identified as a migration destination candidate of a VM guest is actually feasible is simulated. If migration is feasible, then the migration is actually performed in a migration mode in accordance with the power status of the VM guest. As a consequence, it is possible to identify a VM host to which a VM guest may be migrated, and execute a migration to the identified VM host in a migration mode appropriate for the VM guest. Therefore, the VM guests can be migrated in one batch in appropriate migration modes after being determined that the VM guests are migratable. Accordingly, it is also possible to save the time and trouble to confirm the normal termination of the migrations of the VM guests. As a consequence, it is possible to shorten the working time of the manager who manages migration processes of the VM guests compared with one-by-one migration of the VM guests.

[B] Second Embodiment

Next, a migration management apparatus according to a second embodiment will be described. A description will be given here of the configurations of the apparatuses, the flows of processes, effects caused by the second embodiment in the system illustrated in FIG. 1.

Configuration of System

Figure 2:
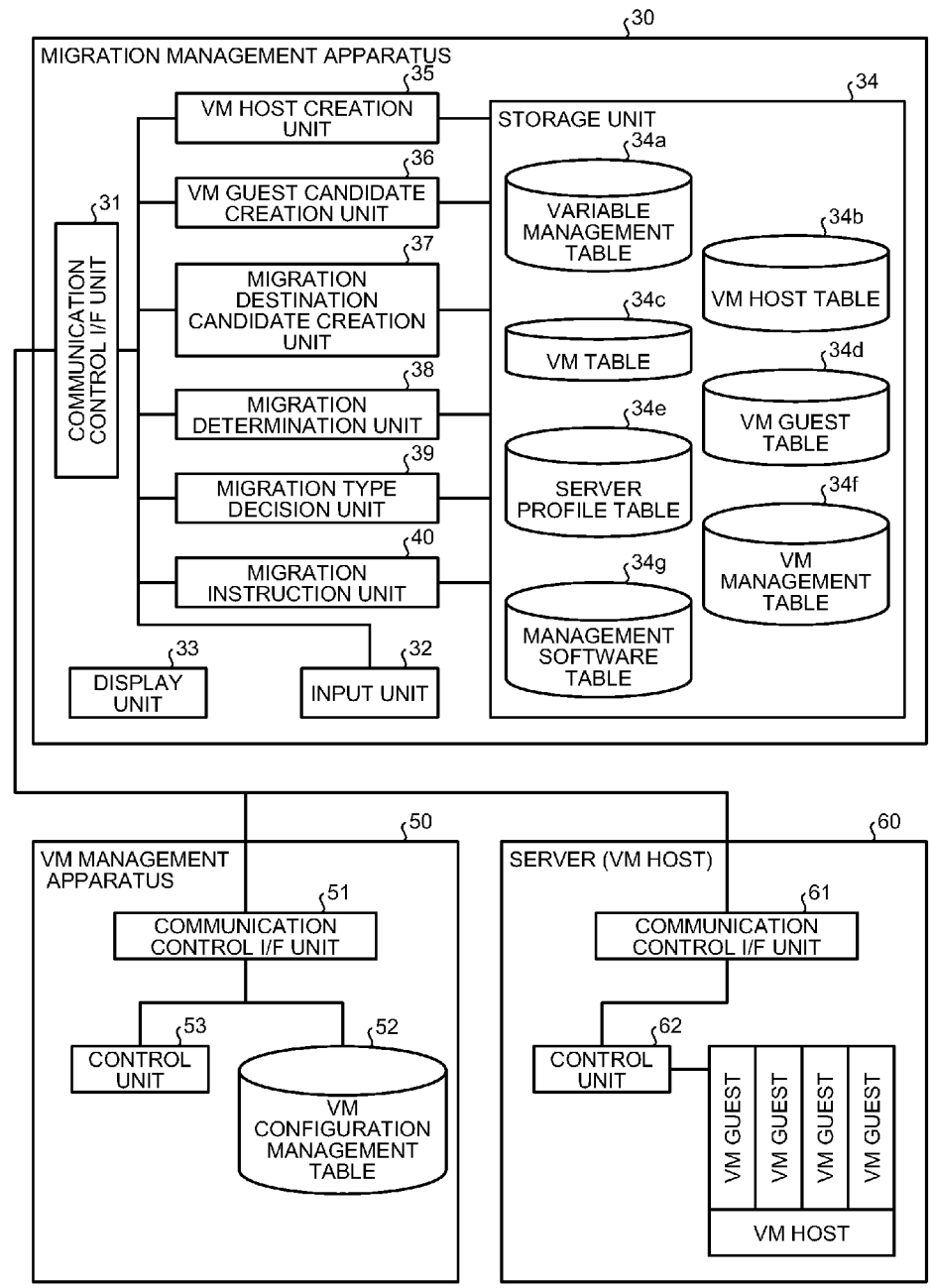
FIG. 2 is a block diagram illustrating the configurations of apparatuses forming a system including a migration management apparatus according to a second embodiment.

FIG. 2 is a block diagram illustrating the configurations of apparatuses forming a system including the migration management apparatus according to the second embodiment. The VM management apparatus 50 and the VM management apparatus 70 have similar configurations. Accordingly, the VM management apparatus 50 will be described here as an example. Similarly, the servers illustrated in FIG. 1 have similar configurations. Accordingly, the server 60 will be described here as an example.

Configuration of Migration Management Apparatus

As illustrated in FIG. 2, the migration management apparatus 30 includes a communication control I/F unit 31, an input unit 32, a display unit 33, a storage unit 34, and control units. The control units are, for example, electronic circuits such as CPUs, and include a VM host creation unit 35, a VM guest candidate creation unit 36, a migration destination candidate creation unit 37, a migration determination unit 38, a migration type decision unit 39, and a migration instruction unit 40.

The communication control I/F unit 31 includes at least one port, and is an interface that controls communication with another apparatus. For example, the communication control I/F unit 31 is connected to the client apparatus 10, receives an instruction to start a migration process of a VM guest, and outputs the instruction to the control units. Moreover, the communication control I/F unit 31 is connected to the VM management apparatuses 50 and 70, and transmits to the VM management apparatuses 50 and 70 an instruction to migrate a VM guest instructed by the migration instruction unit 40. Moreover, the communication control I/F unit 31 receives migration results from the VM management apparatuses 50 and 70. Moreover, the communication control I/F unit 31 transmits Web screens created by the control units to the client apparatus 10.

The input unit 32 is an input device such as a keyboard or a mouse, realizes a pointing device function in cooperation with the display unit 33, accepts an input to an input screen and a selection screen to be displayed on the display unit 33, and outputs the input to the display unit 33 and the control units. One example is that the input unit 32 accepts the selection of a VM host and a VM guest of migration targets, the selection of a migration type, and the like. The display unit 33 is a display device such as a display, and displays Web screens created by the control units, and the like.

The storage unit 34 is a storage device such as a semiconductor memory device or a hard disk. The storage unit 34 includes a variable management table 34a, a VM host table 34b, a VM table 34c, a VM guest table 34d, a server profile table 34e, a VM management table 34f, and a management software table 34g. The information illustrated in the descriptions of the tables is merely illustration, and information is not limited to this, but can be arbitrarily set and changed. Moreover, the information stored in the tables may be updated by the manager or the like, or may be periodically updated by the migration management apparatus 30.

The variable management table 34a stores therein variables used when the control units execute processes. The variable management table 34a stores therein, for example, a src_vm_hosts variable, a src_vm_guests variable, a dst_vm_hosts variable, and a migration_lists variable. The information illustrated in FIGS. 3 to 6 can be arbitrarily changed, for example, from a host name to an IP (Internet Protocol) address, a MAC (Media Access Control) address, or the like.

Figures 3, 4:
FIG. 3 is a diagram illustrating an example of a src_vm_hosts variable stored in a variable management table.
FIG. 4 is a diagram illustrating an example of a src_vm_guests variable stored in the variable management table.

The src_vm_hosts variable is used when the VM host creation unit 35 and the like create a Web screen to display a migration source VM host. FIG. 3 is a diagram illustrating an example of the src_vm_hosts variable stored in the variable management table. As illustrated in FIG. 3, the variable management table 34a stores "array_index, ID, NAME" as the src_vm_hosts variable therein. "array_index" stored here is an identifier to identify the location in an array to store. "ID" is an identifier used to distinguish a VM host. "NAME" is the host name of a migration source VM host.

A description will be given with the example of FIG. 3. A case of "array_index=0, ID=1, NAME=Host_a" indicates that information on a VM host having a host name "Host_a" to which an ID "1" is assigned is stored in array "0" of the src_vm_hosts variable. Moreover, a case of "array_index=7, ID=8, NAME=Host_h" indicates that information on a VM host having a host name of "Host_h" to which an ID "8" is assigned is stored in array "7" of the src_vm_hosts variable.

The src_vm_guests variable is used when the VM guest candidate creation unit 36 and the like create a Web screen that displays a VM guest being a migration target. FIG. 4 is a diagram illustrating an example of the src_vm_guests variable stored in the variable management table. s1 of FIG. 4 indicates a migration candidate VM guest list. s2 of FIG. 4 indicates a state after "Guest_c1" has been decided as a migration target from the state of s1. As illustrated in FIG. 4, the variable management table 34a stores "Hash_key, array_index, ID, NAME" as the src_vm_guests variable therein. "Hash_key" stored here is an identifier to identify a VM host that runs a VM guest stored in "NAME." "array_index" is an identifier to identify a storage location. Moreover, "ID" is an identifier used to distinguish a VM guest. "NAME" is the name of a migration candidate VM guest.

A case of "Hash_key=2, array_index=2, ID=23, NAME=Guest_b3," which is illustrated in s1 of FIG. 4, will be described. In this case, a VM guest "Guest_b3" being a migration target candidate to which an ID "23" is assigned is stored in array "2" associated with a VM host to be distinguished with Hash_key "2." Moreover, a case of "Hash_key=3, array_index=1, ID=27, NAME=Guest_c3" will be described. In this case, a VM guest "Guest_c3" being a migration target candidate to which an ID "27" is assigned is stored in array "1" associated with a VM host to be distinguished with Hash_key "3." Moreover, if "NAME=Guest_c1" is identified as a migration target in the state of s1 of FIG. 4, a record of "Hash_key=3, array_index=1, ID=27, NAME=Guest_c3" is deleted as illustrated in s2 of FIG. 4.

The dst_vm_hosts variable is used when the migration destination candidate creation unit 37 and the like create a Web screen to display a migration destination candidate VM host. FIG. 5 is a diagram illustrating an example of the dst_vm_hosts variable stored in the variable management table. s3 of FIG. 5 indicates a migration destination candidate VM host list. s4 of FIG. 5 indicates a list of VM hosts being migration destination candidates after "Guest_b2" has been decided as a migration target in the state of s3. As illustrated in FIG. 5, the variable management table 34a stores "Hash_key, array_index, ID, NAME" as the dst_vm_hosts variable therein. "Hash_key" stored here is an identifier to identify a host to be a migration source. "array_index" is an identifier to identify a storage location. Moreover, "ID" is an identifier used to distinguish a migration destination candidate VM host. "NAME" is the host name of a migration destination candidate VM host.

A case of "Hash_key=3, array_index=0, ID=1, NAME=Host_a," which is illustrated in s3 of FIG. 5, will be described. This case indicates that "Host_a" to which an ID "1" is assigned is stored as a migration destination candidate VM host in array "0" associated with a migration source VM host with Hash_key "3." Moreover, if the VM guest "Guest_b2" has been decided as a migration target in the state of s3 of FIG. 5, "Hash_key=2, array_index=0, ID=6, NAME=Host_f" and "Hash_key=2, array_index=1, ID=7, NAME=Host_g" are added as illustrated in s4 of FIG. 5. In other words, the migration destination candidate creation unit 37 adds to the dst_vm_hosts variable VM hosts "Host_f" and "Host_g" as migration destination candidates of the VM guest "Guest_b2" decided as the migration target.

The migration_lists variable is used when the migration determination unit 38 and the like decide a migration method of a migration target VM guest and when the migration instruction unit 40 transmits a migration instruction. FIG. 6 is a diagram illustrating an example of the migration_lists variable stored in the variable management table. As illustrated in FIG. 6, the variable management table 34a stores "Hash_key, array_index, ID, migration_type" as the migration_lists variable therein. "Hash_key" stored here is an identifier to identify a VM host to be a migration destination. "array_index" is an identifier to identify a storage location. Moreover, "ID" is an identifier used to distinguish a VM guest. "migration_type" is information indicating a migration method.

A description will be given with the example of FIG. 6. A VM guest of "ID=22" stored in array "0" with a VM host of "Hash_key=7" as a migration destination indicates to be cold-migrated. Moreover, a VM guest of "ID=23" stored in array "1" with the VM host of "Hash_key=7" as a migration destination indicates to be live-migrated. Moreover, a VM guest of "ID=25" stored in array "0" with a VM host of "Hash_key=1" as a migration destination indicates to be live-migrated.

Return to FIG. 2. The VM host table 34b stores therein a list of VM hosts managed by the migration management apparatus 30. FIG. 7 is a diagram illustrating examples of information stored in the VM host table 34b. As illustrated in FIG. 7, the VM host table 34b associates "ID, NAME, api_type, virtual_machines, logical_server_id(SV)" and stores them as VM host information therein. The information stored here may be at any time updated manually, by a job or the like by the manager or the like, or may be periodically acquired by the migration management apparatus 30 from the VM management apparatuses.

"ID" stored here is an identifier to identify information stored in the VM host table 34b. "NAME" is the host name of a VM host. "api_type" indicates the type of an API (Application Programming Interface) that realizes a VM host and runs a VM guest. "virtual_machines" is information indicating VM guests that run, and is stored in an array. "logical_server_id(SV)" is an identifier to identify a record of the server profile table, which is described below.

In the case of the example of FIG. 7, information on a VM host "Host_b" that executes VM guests "VM 101 to VM 104" on "API(B)" is stored in "ID=2". The "Host_b" information is associated with "logical_server_id(SV)=2."Moreover, information on a VM host "Host_c" that executes VM guests "VM 105 to VM 107" on "API(A)" is stored in "ID=3." The "Host_c" information is associated with "logical_server_id (SV)=3." "Omitted" described in FIG. 7 indicates the omission of description for convenience of description. For example, information on VM 201 to VM 203 and the like is stored.

The VM table 34c stores therein detailed information on a VM guest running as a virtual machine on a VM host. FIG. 8 is a diagram illustrating examples of information stored in the VM table. As illustrated in FIG. 8, the VM table 34c associates "ID, os_instance, power_status, vm_host_id, memory capacity, the number of CPUs, the specification of CPU(s)" and stores them as detailed information on a VM guest therein.

"ID" stored here is an identifier to identify the records of the VM table 34c. "os_instance" is information indicating a link destination of a VM guest object, and is information to identify a VM guest that runs as a virtual machine. "power_status" indicates the power status of a virtual machine, that is, a VM guest. "ON" is stored if the power is on, "OFF" if the power is off, and "unknown" if it was not possible to detect the power status. "vm_host_id" is information to identify a VM host on which a VM guest runs, and stores the ID of the VM host table 34b therein. The "memory capacity" is memory capacity assigned to a VM guest. The "number of CPUs" is the number of CPUs assigned to a VM guest. The "specification of CPU(s)" is information indicating the performance of a CPU(s) assigned to a VM guest, and indicates here an example where the clock frequency of the CPU(s) is stored.

In the case of the example of FIG. 8, a record of ID "101" indicates that the memory capacity is 1 GB, and a VM guest "Guest_b1" to which two CPUs of 1.2 GHz are assigned is running, on a VM host to which "vm_host_id=2" is assigned. Moreover, a record of ID "102" indicates that the memory capacity is 750 MB, and the VM guest "Guest_b2" to which two CPUs of 3 GHz are assigned is being suspended, on the VM host to which "vm_host_id=2" is assigned. Moreover, a record of ID "106" indicates that the memory capacity is 1 GB, and a VM guest "Guest_c2" to which three CPUs of 2 GHz are assigned exists, but is in a state where the power status is not detectable, on a VM host to which "vm_host_id=3" is assigned.

The VM guest table 34d stores information on a VM guest therein. FIG. 9 is a diagram illustrating examples of information stored in the VM guest table. As illustrated in FIG. 9, the VM guest table 34d associates "ID, NAME, logical_server_id(VM)" and stores them as information on a VM guest therein. "ID" stored here is an identifier to uniquely identify a VM guest. "NAME" is a name indicating a VM guest. "logical_server_id(VM)" is an identifier used to identify a VM host, and stores "ID" to be stored in the VM table 34c therein.

In the case of the example of FIG. 9, information on the VM guest "Guest_b1" with ID "21" indicates to correspond to the record of the ID "101" of the VM table 34c. Similarly, information on the VM guest "Guest_c1" with ID "25" indicates to correspond to a record of ID "105" of the VM table 34c.

The server profile table 34e stores therein information on VM management software that may be used in a VM host, for each VM host. FIG. 10 is a diagram illustrating examples of information stored in the server profile table 34e. As illustrated in FIG. 10, the server profile table 34e associates "ID, os_instance, vm_managings" and stores them as VM host information therein.

"ID" stored here is a record stored in the server profile table 34e, in other words, an identifier to identify a VM host. "os_instance" is information indicating a link destination of a VM host object, and is information to identify a VM host on which a VM guest runs. "vm_managings" indicates VM management software that may be used in a VM host, in other words, the type of API that may support the VM host, and is stored in an array. The case of FIG. 10 indicates that the VM host "Host_a" with ID "1" supports AP1, AP2, and AP4. "Omitted" described in FIG. 10 simply indicates the omission of description for convenience of description. Information on AP1 and the like is generally stored.

The VM management table 34f stores therein information that identifies a software group to which VM management software of a VM host stored in the server profile table 34e belongs. FIG. 11 is a diagram illustrating examples of information stored in the VM management table. As illustrated in FIG. 11, the VM management table 34f associates "ID, management software id, logical_server_id(SV)" and stores them therein.

"ID" stored here is an identifier to identify the records of the server profile table 34e. "management software id" is information to identify a software group to which VM management software belongs. "logical_server_id(SV)" is an identifier to identify the record of the server profile table. A description will be given with the example of FIG. 11. A record of ID "1" indicates that a record of ID "8" of the server profile table 34e belongs to a software group "1". Similarly, a record of ID "3" indicates that a record of ID "9" of the server profile table 34e belongs to a software group "2".

The management software table 34g stores a software group of the VM management software therein. FIG. 12 is a diagram illustrating examples of information stored in the management software table. As illustrated in FIG. 12, the management software table 34g stores therein "1, Managing1, Managing3," "2, Managing2", and the like as "ID, managings."

"ID" stored here is an identifier to identify the records of the management software table 34g as well as identify "managings," and is a similar identifier to an identifier stored in "management_software_id" of the VM management table 34f. "managings" indicates a software group of the VM management software. A description will be given with the example of FIG. 12. "Managing1" and "Managing3" being the VM management software indicates to belong to the same group of ID "1," and "Managing2" to belong to a group of ID "2."

Figure 13:
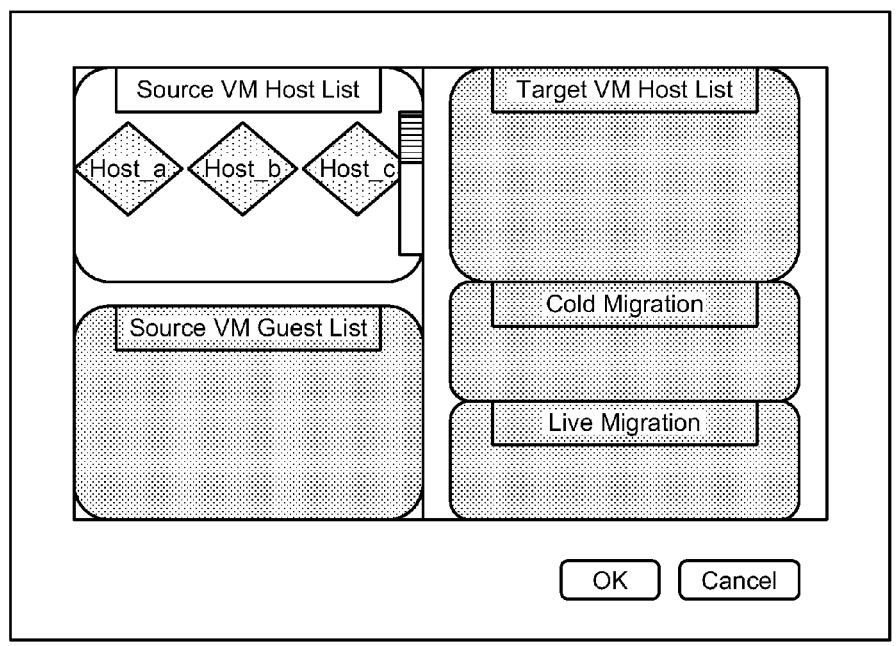
FIG. 13 is a diagram illustrating a top screen example of a migration process.

Return to FIG. 2. The VM host creation unit 35 creates a list of VM hosts to be migration sources. For example, when an instruction to start a migration process of a VM guest, the instruction having been transmitted from the client apparatus 10, is accepted by the communication control I/F unit 31 and the like, the VM host creation unit 35 transmits a Web screen illustrated in FIG. 13 to the client apparatus 10. FIG. 13 is a diagram illustrating a top screen example of the migration process. The top screen illustrated in FIG. 13 includes a "Source VM Host List" field, a "Source VM Guest List" field, a "Target VM Host List" field, a "Cold Migration" field, and a "Live Migration" field. Moreover, the fields may be provided with scrolls to move a display content up, down, left, and right.

A list of migration source VM hosts is displayed in the "Source VM Host List" field. A list of VM guests that run on a VM host selected by the user among VM hosts displayed in the "Source VM Host List" field is displayed as migration target candidate VM guests in the "Source VM Guest List" field. A list of VM hosts being the migration destination candidates of VM guests identified as migration targets is displayed in the "Target VM Host List" field. A list of VM guests whose migration types were decided to be cold migration among VM guests whose migration destination VM hosts had been decided is displayed in the "Cold Migration" field. A list of VM guests whose migration types were decided to be live migration among VM guests whose migration destination VM hosts had been decided is displayed in the "Live Migration" field. Moreover, if an "OK" button is clicked, the migrations of VM guests displayed in the "Cold Migration" field and the "Live Migration" field start. If a "Cancel" button is clicked, the migration process ends.

The VM host creation unit 35 that has displayed the top screen acquires VM host names from "NAME" in the records of the VM host table 34b. The VM host creation unit 35 then creates a screen where the acquired VM host names are displayed in the "Source VM Host List" filed on the top screen, and transmits the screen to the client apparatus 10. At this point, the VM host creation unit 35 associates "ID" and "NAME" of the VM host table 34b, sequentially acquires them, and stores them in the src_vm_hosts variable sequentially from array "0" thereof. The order of storage is not limited to the ascending order of array numbers, but "ID" and "NAME" may be randomly acquired and stored in the array.

One example is that the VM host creation unit 35 displays the top screen, then acquires "NAME" illustrated in FIG. 7, and creates icons and the like that display the acquired "NAME." The VM host creation unit 35 then creates a screen where the created icons are displayed in the "Source VM Host List" field, and transmits the screen to the client apparatus 10. Moreover, the VM host creation unit 35 stores "ID" and "NAME" of the VM host table 34b in the array of the src_vm_hosts variable in the order of the created icons. Specifically, the VM host creation unit 35 stores "NAME" and "ID" displayed on an icon created first in array "0," and stores "NAME" and "ID" displayed on an icon created second in array "1." By doing so, the VM host creation unit 35 can associate the icons and the information of the table.

Return to FIG. 2. The VM guest candidate creation unit 36 creates a list of VM guests to be migration target candidates. For example, the VM guest candidate creation unit 36 accepts a selection by the user via the communication control I/F unit 31 from the VM hosts displayed in the "Source VM Host List" field on the screen displayed by the VM host creation unit 35. The VM guest candidate creation unit 36 then extracts a VM guest running on the selected VM host, and transmits to the client apparatus 10 a screen where the extracted VM guest is displayed in the "Source VM Guest List" field.

A specific example is that the VM guest candidate creation unit 36 creates the src_vm_guests variable when the migration source VM host list is displayed by the VM host creation unit 35. If the icon of a VM host is clicked, then the VM guest candidate creation unit 36 identifies the clicked VM host from an array of the src_vm_hosts variable corresponding to the icon. Next, the VM guest candidate creation unit 36 creates an icon that displays a VM guest name associated with the identified VM host and stored in "NAME" of the src_vm_guests variable. The VM guest candidate creation unit 36 subsequently transmits to the client apparatus 10 a screen where the created icon is displayed in the "Source VM Guest List" field. In other words, the VM guest candidate creation unit 36 displays for the user a VM guest that runs on the selected VM host as a migration target candidate VM guest.

A description will be given here first of an example of the creation of the src_vm_guests variable. The VM guest candidate creation unit 36 refers to the VM host table 34b, and identifies "VM 101 to VM 104" as "virtual_machines" corresponding to "NAME=Host_b" of the src_vm_hosts variable. The VM guest candidate creation unit 36 then searches the VM guest table 34d with "101" of the "VM 101" as a key and identifies "ID=21" and "NAME=Guest_b1." Moreover, the VM guest candidate creation unit 36 searches the VM table 34c with "101" of the "VM 101" as a key and identifies "vm_host_id=2." The VM guest candidate creation unit 36 subsequently creates the src_vm_guests variable where identified "ID=21" and "NAME=Guest_b1" have been registered in array (array_index) "0" where identified "vm_host_id=2" is set in "Hash_key."

Similarly, the VM guest candidate creation unit 36 executes the above process also for "NAME=Guest_b2," "NAME=Guest_b3," "NAME=Guest_b4" that run on "Host_b" similarly to "NAME=Guest_b1." Specifically, the VM guest candidate creation unit 36 stores "NAME=Guest_b2" in array "1" where "vm_host_id=2" is set in "Hash_key," stores "NAME=Guest_b3" in array "2,", and stores "NAME=Guest_b4" in array "3." In this manner, the VM guest candidate creation unit 36 executes the above process to create the src_vm_guests variable illustrated in FIG. 4 for each VM host stored in the src_vm_hosts variable.

At this point, it is also possible to set such that when searching the VM table 34c, the VM guest candidate creation unit 36 dose not store a VM guest whose "power_status" is "unknown" in the src_vm_guests variable. For example, "power_status" of "Guest_b4" illustrated in FIG. 8 is "unknown" and accordingly the VM guest candidate creation unit 36 has not stored "Guest_b4" in the src_vm_guests variable as illustrated in s1 of FIG. 4.

Next, a description will be given of an example where migration target candidate VM guests are displayed if the user selects a VM host in a state where the VM guest candidate creation unit 36 has created the src_vm_guests variable. For example, when an icon that displays a VM host is clicked, the VM guest candidate creation unit 36 identifies the clicked VM host from an array of the src_vm_hosts variable corresponding to the icon.

It is assumed here that "Host_b" has been selected by the user. In this case, the VM guest candidate creation unit 36 refers to the src_vm_hosts variable, and identifies "ID=2" corresponding to "Host_b." The VM guest candidate creation unit 36 then searches "Hash_key" of the src_vm_guest variable with "ID=2" as a key, and identifies "NAME=Guest_b1" to "NAME=Guest_b3." The VM guest candidate creation unit 36 subsequently creates icons respectively representing "NAME=Guest_b1" to "NAME=Guest_b3," and transmits to the client apparatus 10 a screen where the created icons are displayed in the "Source VM Guest List" field. The VM guest candidate creation unit 36 creates and displays icons in the order of array_index and accordingly can also associate the icons and the src_vm_guest variables.

Return to FIG. 2. When a migration target VM guest has been decided, the migration destination candidate creation unit 37 creates a list of VM hosts being migration destination target candidates. Specifically, the migration destination candidate creation unit 37 identifies a migration target VM guest by a selection by the user, and creates the migration destination candidates of the identified VM guest to display them for the user.

For example, it is assumed that the user clicks "Guest_b2" created by the VM guest candidate creation unit 36 in the "Source VM Guest List" field. In this case, the migration destination candidate creation unit 37 identifies clicked "Guest_b2" as the migration target VM guest. Next, the migration destination candidate creation unit 37 identifies "Hash_key=2" of "Guest_b2" from the src_vm_guests variable, and searches "ID" of the VM host table 34b with "Hash_key=2" as a key. The migration destination candidate creation unit 37 then extracts "NAME=Host_b" and "api_type=API (B)" corresponding to "Hash_key=2" from the VM host table 34b. In this manner, the migration destination candidate creation unit 37 can identify api_type of a VM host on which a migration target VM guest runs, in other words, the type of VM management software executed by a migration source VM host.

The migration destination candidate creation unit 37 subsequently searches "api_type" of the VM host table 34b with "api_type=API(B)" as a key, and identifies "NAME" and "ID" associated with "api_type=API(B)." In the case of the example of FIG. 7, the migration destination candidate creation unit 37 identifies "NAME=Host_f, ID=6" and "NAME=Host_g, ID=7" as VM hosts of "api_type=API(B)." In this manner, the migration destination candidate creation unit 37 can identify migration destination candidates that provide a similar VM operating environment to a migration source VM host.

At this point, if there exists no migration destination having the same management software as the migration source VM host, the migration destination candidate creation unit 37 may identify a migration destination that executes management software compatible with management software executed by the migration source VM host. Furthermore, the migration destination candidate creation unit 37 may identify a VM host that executes management software that is not the same but of the same type as the management software of the migration source VM host. In the case of the above example, the migration destination candidate creation unit 37 may identify not only "NAME" and "ID" that execute the same management software as "api_type=API(B)" but also "NAME" and "ID"

that execute "API(B−1)" of the same type as "api_type=API (B)." Moreover, as another example, the migration destination candidate creation unit 37 refers to the VM management table 34f and the management software table 34g, and identifies a group "managings" to which the VM management software of the migration source VM host belongs. The migration destination candidate creation unit 37 can also make a VM host belonging to the same group as the identified group "managings" a migration destination candidate.

The migration destination candidate creation unit 37 subsequently stores "ID=6, NAME=Host_f" in "array_index=0," and stores "ID=7, NAME=Host_g" in "array_index=1" in the dst_vm_hosts variable while associating them with "Hash_key=2" of the migration source VM host. In this manner, the migration destination candidate creation unit 37 creates the dst_vm_hosts variables. The migration destination candidate creation unit 37 then creates icons and the like that display "NAME" stored in the dst_vm_hosts variable, and transmits to the client apparatus 10 a screen where the created icons and the like are further displayed in the "Target VM Host List" field. The migration destination candidate creation unit 37 creates and displays the icons in the order of Hash_key and array_index and accordingly can also associate the icons with the dst_vm_hosts variables.

Return to FIG. 2. The migration determination unit 38 executes a migration simulation for the VM host identified as the migration destination of the migration target VM guest and determines whether or not the migration target VM guest is migratable. For example, the migration determination unit 38 first accepts a selection by the user from the screen created by the migration destination candidate creation unit 37, and identifies a VM host to be a migration destination candidate. Next, the migration determination unit 38 uses the resource status and the like of the migration target VM guest identified by the migration destination candidate creation unit 37 to execute a migration simulation for the migration destination target VM host, and determines whether or not the migration target VM guest is migratable. If it is determined to be migratable, the migration determination unit 38 subsequently notifies as such to the migration type decision unit 39, and migrates the process and, if it is determined to be not migratable, notifies as such to the user and let the user select another VM host.

It is assumed here that a user terminal clicks "Host_c" created by the migration destination candidate creation unit 37 and displayed in the "Target VM Host List" field. In this case, the migration determination unit 38 identifies "Host_c" as a migration destination candidate VM host. In other words, the migration determination unit 38 identifies "Guest_b2" as the migration target VM guest, and "Host_c" as the migration destination candidate VM host.

Next, the migration determination unit 38 determines from the migration_lists variable whether or not there exists a VM guest that the VM host "Host_c" has already been decided as the migration destination. Specifically, the migration determination unit 38 determines whether or not there exists a record of "Hash_key=2" representing "Host_c" in the migration_lists variable. If there exists no "Hash_key=2" in the migration_lists variable, then the migration determination unit 38 determines that "Guest_b2" being the current migration target is the only VM guest whose migration destination candidate is "Host_c."

In this case, the migration determination unit 38 issues a migration command of "Guest_b2" to "Host_c" to determine whether or not "Guest_b2" is migratable. As a method, the migration determination unit 38 can also make a determination depending on whether or not the number of VM guests running on "Host_c" exceeds the upper limit of "Host_c." Moreover, the migration determination unit 38 acquires the resource status of "Host_c" from the VM management apparatus as well as acquires the resource status of "Guest_b2" from the VM table 34c, and can also determine whether or not "Guest_b2" is migratable depending on whether or not "Guest_b2" can run on "Host_c." The resource status includes the number of CPUs, memory capacity, and a network bandwidth.

On the other hand, if there exists "Hash_key=2" in the migration_lists variable, the migration determination unit 38 determines whether or not the VM management software that runs on the migration destination candidate VM host "Host_c" is software that supports a plurality of migrations. One example is that the migration determination unit 38 refers to the server profile table 34e, and extracts "ID" associated with the migration destination candidate VM host "Host_c." The migration determination unit 38 then extracts "management_software_id" associated with the extracted "ID" from the VM management table 34f. Furthermore, the migration determination unit 38 identifies "managings" associated with the extracted "management_software_id" from the management software table 34g. The migration determination unit 38 then determines whether or not the identified "managings" is of the type of software that supports a plurality of migrations, based on information registered in a memory or the like by the Internet, the manager or the like, and the like.

If determining that it is software that supports a plurality of migrations, then the migration determination unit 38 identifies the resource statuses that may be used by "Guest_b2" from the resource status of "Host_c" and the resource status of a different VM guest that has already been decided to be migrated. The migration determination unit 38 subsequently determines whether or not "Guest_b2" can be migrated to "Host_c" depending on whether or not "Guest_b2" can run in the identified resource statuses. As another example, the migration determination unit 38 simultaneously issues migration commands of "Guest_b2" and the different VM guest and can also make whether or not an error occurs a determination basis.

Moreover, if determining that it is software that does not support a plurality of migrations, the migration determination unit 38 creates one resource status where the resource status of the different VM guest that has already been decided to be migrated and the resource status of "Guest_b2" are added. If the created one resource status is within the scope of the resource status of "Host_c," then the migration determination unit 38 determines that "Guest_b2" is migratable. On the other hand, if the created one resource status is not within the scope of the resource status of "Host_c," the migration determination unit 38 determines that the different VM guest is migratable to "Host_c" and "Guest_b2" is not migratable to "Host_c." The migration determination unit 38 can acquire the resource status of the different VM guest and the resource status of "Guest_b2" from the VM table 34c, and can acquire the resource information of "Host_c" from the VM management apparatuses 50 and 70. In this manner, the migration determination unit 38 identifies the migration destination of a VM guest.

The migration type decision unit 39 decides the migration type of a migration target VM guest identified by the migration determination unit 38. Specifically, the migration type decision unit 39 refers to the VM table 34c and decides that the migration type of a migration target VM guest is "live migration" if the power status of the VM guest is "ON." Moreover, the migration type decision unit 39 refers to the VM table 34c and decides that the migration type of a migration target VM guest is "cold migration" if the power status of the VM guest is "OFF." Moreover, the migration type decision unit 39 refers to the VM table 34c and may notify the user that the migration of a migration target VM guest is "unfeasible", and may decide that the migration type is "cold migration" if the power status of the VM guest is "unknown."

The migration type decision unit 39 then acquires "NAME" of a VM guest whose migration type has been decided to be "cold migration" from the VM guest table 34d, and creates an icon and the like. The migration type decision unit 39 subsequently displays the created icon and the like in the "Cold Migration" field on the screen. Similarly, the migration type decision unit 39 acquires "NAME" of a VM guest whose migration type has been decided to be "live migration" from the VM guest table 34d, and creates an icon and the like. The migration type decision unit 39 subsequently displays the created icon and the like in the "Live Migration" field on the screen. The migration type decision unit 39 subsequently transmits the screen where the created icon is displayed to the client apparatus 10.

At this point, the migration type decision unit 39 acquires "Hash_key" of a migration destination VM host from the VM host table 34b and the like, and acquires "ID" of the migration target VM guest from the VM guest table 34d and the like. The migration type decision unit 39 then associates "Hash_key," "ID," and the decided "migration type" and stores them in the migration_lists variable.

For example, an example will be described in which "Guest_c2" has been decided to be "live-migration" to "Host_g" in the state illustrated in FIG. 6. In this case, the migration type decision unit 39 identifies "ID=26" of "Guest_c2" from the VM guest table 34d, and acquires "Hash_key=7" of "Host_g" from the VM host table 34b. Data have already been registered in arrays "0" and "1" of "Hash_key=7" of the migration_lists variable and accordingly, the migration type decision unit 39 associates "ID=26" and "live" with array "2" where "Hash_key=7" and stores them in the migration_lists variable.

If the migration destinations and migration modes of VM guests being migration targets have been decided, the migration instruction unit 40 migrates the VM guests to their respective migration destinations decided by the migration type decision unit 39 in their respective migration modes decided by the migration type decision unit 39.

A description will be given taking, for example, FIG. 6 as an example. The migration instruction unit 40 refers to the migration_lists variable if "OK" is clicked on a screen displayed on the client apparatus 10. The migration instruction unit 40 then instructs the VM management apparatuses 50 and 70 that manage a VM host on which a VM guest of "ID=22" runs to migrate the VM guest of "ID=22" to a VM host identified with "Hash_key=7" by "cold migration."

At this point, the migration instruction unit 40 may execute the migrations of migration target VM guests all at once. Moreover, the migration instruction unit 40 may execute the migration of a VM guest where "migration_type=Live" after executing and completing the migration of a VM guest where "migration_type=cold" first. The migration instruction unit 40 then returns the migration_lists variable to an initial value when the migration to be stored in the migration_lists variable ends.

Configuration of VM Management Apparatus

Next, the configuration of the VM management apparatus will be described. As illustrated in FIG. 2, the VM management apparatus 50 includes a communication control I/F unit 51, a VM configuration management table 52, and a control unit 53.

The communication control I/F unit 51 includes at least one port, and is an interface that controls communication between the migration management apparatus 30 and the VM management apparatus 50 and communication between the servers 60 and the VM management apparatus 50. For example, the communication control I/F unit 51 receives an instruction to migrate a VM guest, from the VM management apparatus 50, and receives and transmits various communications on migrations between VM hosts.

The VM configuration management table 52 is a storage device such as a semiconductor memory device or a hard disk, and stores information on a VM host and a VM guest under the management of the VM management apparatus 50. For example, the VM configuration management table 52 stores therein the IP address of a server, a VM host running on the server, VM management software that provides a VM environment, the resource status that may be used in the VM host, the number of running VM guests, resource statuses, and the like. The information stored here can be arbitrarily set and changed, and may be registered and updated by the manager or the like, or may be periodically acquired from the servers. Moreover, the control unit 53 of the VM management apparatus 50 may periodically transmit information stored in the VM configuration management table 52 to the migration management apparatus 30.

The control unit 53 is an electronic circuit such as a CPU including internal memory, and controls various processes to be executed by the VM management apparatus 50. For example, the control unit 53 receives a "migration type", a "VM guest", and "VM hosts" as a migration instruction from the migration management apparatus 30. The control unit 53 then transmits a cold migration instruction to a migration source VM host and a migration destination VM host of the instructed VM guest if the "migration type" is "cold." The migration executed here is a general migration so that the detailed description will be omitted. For example, the migration instruction includes an instruction to create a migration target VM guest, a pre-copy instruction and a stop-and-copy instruction to copy a memory content, an instruction to activate a VM guest whose migration is complete, and a VM guest deletion instruction to a migration source.

Configuration of Server

Next, the configuration of each server illustrated in FIG. 1 will be described. As illustrated in FIG. 2, the server 60 includes a communication control I/F unit 61 and a control unit 62.

The communication control I/F unit 61 includes at least one port, and is an interface that controls communication between the server 60 and the VM management apparatus 50. For example, the communication control I/F unit 61 receives the above migration instruction from the VM management apparatus 50, and notifies the migration instruction to the control unit 62.

The control unit 62 is an electronic circuit such as a CPU including internal memory, and executes various processes in the server 60. For example, the control unit 62 runs VM management software to execute a VM host, and runs a VM guest on the VM host to realize a virtual machine environment. Moreover, the control unit 62 executes the migration process such as the creation of a VM guest, pre-copy, stop-and-copy, VM activation, and VM deletion in accordance with the migration instruction received from the VM management apparatus 50.

Flows of Processes

Next, the flows of processes to be executed by the migration management apparatus 30 will be described using FIGS. 14 to 18. The entire flow of the processes and the flow of a VM guest candidate creation process will be described here using FIGS. 14 and 15, respectively. Moreover, the flow of a migration destination candidate VM host list creation process, the flow of a migration feasibility determination process, and the flow of a migration type decision process will be described here using FIGS. 16, 17, and 18, respectively.

Entire Flow of Processes

Figure 14:
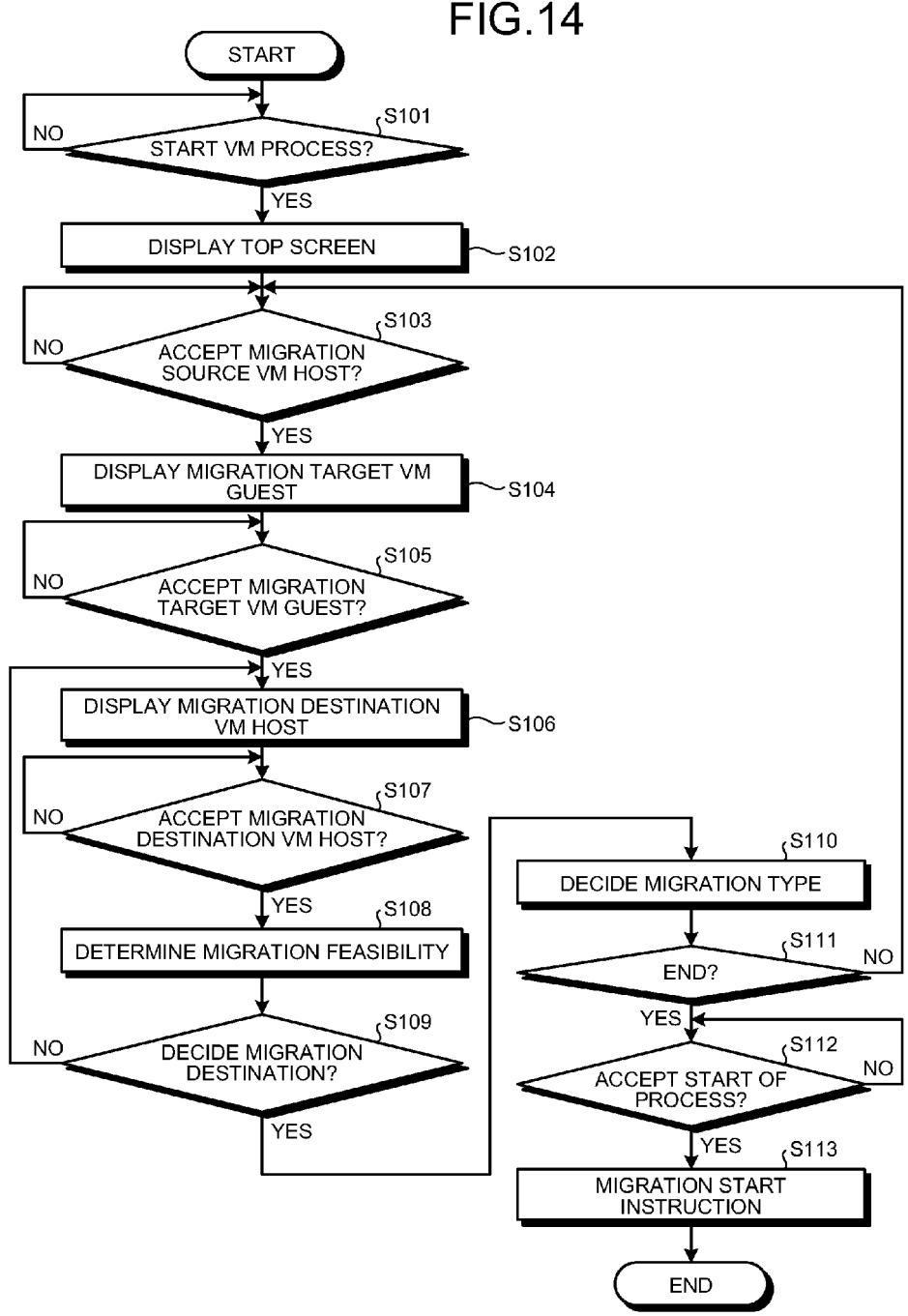
FIG. 14 is a flowchart explaining the entire flow of processes to be executed by the migration management apparatus.

FIG. 14 is a flowchart explaining the entire flow of processes to be executed by the migration management apparatus 30. As illustrated in FIG. 14, when receiving a VM process start instruction from the client apparatus 10 (Yes in S101), the VM host creation unit 35 of the migration management apparatus 30 transmits the TOP screen illustrated in FIG. 13 to the client apparatus 10 (S102). Moreover, the VM process start instruction can also be received from the manager via the input unit 32.

Next, the VM host creation unit 35 transmits to the client apparatus 10 a screen where VM host names are displayed in the "Source VM Host List" field on the top screen, and accepts the selection of a migration source VM host (S103). For example, when accepting the VM process start instruction, the VM host creation unit 35 stores the VM hosts stored in the VM host table 34b in the src_vm_hosts variable, and transmits a screen to select a migration source VM host to the client apparatus 10.

When accepting the selection of a migration source VM host (Yes in S103), the VM guest candidate creation unit 36 transmits to the client apparatus 10 a screen where VM guests running on the selected VM host are displayed in the "Source VM Guest List" field (S104).

Next, the migration destination candidate creation unit 37 accepts the selection of a VM guest to be a migration target on the screen created by the VM guest candidate creation unit 36 (Yes in S105). The migration destination candidate creation unit 37 subsequently transmits to the client apparatus 10 a screen where migration destination candidates of the selected VM guest are displayed in the "Target VM Host List" field (S106). At this point, the migration destination candidate creation unit 37 decides a migration destination candidate VM host based on the VM management software of the migration source VM host, and the like.

The migration determination unit 38 then accepts the selection of a VM host to be a migration destination candidate on the screen created by the migration destination candidate creation unit 37 (Yes in S107). The migration determination unit 38 subsequently determines by a simulation whether or not the VM guest selected in S105 is migratable to the VM host selected in S107 (S108).

The migration type decision unit 39 then decides, as a migration destination, the VM host that has been determined by the migration determination unit 38 to be migratable (Yes in S109), and decides the migration type in accordance with the power status of the VM guest selected in S105 (S110). On the other hand, if determining that the VM guest is not migratable to the VM host selected by the user (No in S109), the migration determination unit 38 returns to S106, allows the user to select another VM host, and then executes the process from S107 and onwards.

If the user determines that the processes from S103 to S110 have ended for all the migration target VM guests (Yes in S111), and clicks the "OK" button on the screen displayed on the client apparatus 10 (Yes in S112), then the migration instruction unit 40 executes S113. In other words, if the migration destinations and migration modes of VM guests being migration targets have been decided, the migration instruction unit 40 migrates the VM guests to their respective migration destinations decided by the migration type decision unit 39 in their respective migration modes decided by the migration type decision unit 39. On the other hand, if the user determines to execute the processes from S103 to S110 for another VM guest (No in S111), the processes from S103 and onwards are repeated.

Flow of VM Guest Candidate Creation Process

Figure 15:
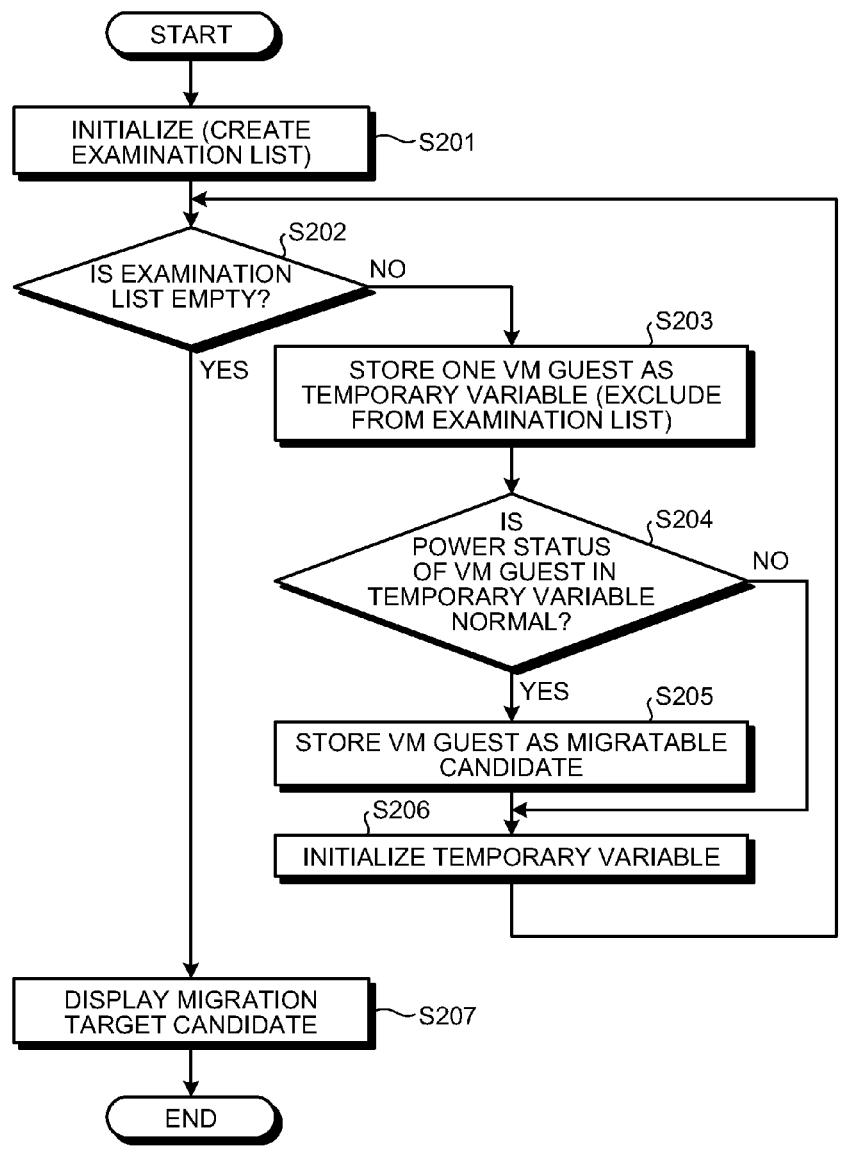
FIG. 15 is a flowchart explaining the flow of a VM guest candidate creation process.

FIG. 15 is a flowchart explaining the flow of the VM guest candidate creation process. The processes are executed in S104 to S105 illustrated in FIG. 14. The flowchart described below is executed in a state where one VM host has been selected from the VM host list displayed by the VM host creation unit 35.

The VM guest candidate creation unit 36 performs initialization when starting the process (S201). In other words, the VM guest candidate creation unit 36 empties the src_vm_guests variable. Moreover, the VM guest candidate creation unit 36 identifies a VM guest that runs on a VM host selected by the user from the VM host table 34b and the VM guest table 34d and stores the VM guest in an examination list used to create the src_vm_guest variable.

Next, if information is stored in the examination list (Yes in S202), the VM guest candidate creation unit 36 creates a screen where migration target candidates are displayed, and transmits the screen to the client apparatus 10. In other words, the VM guest candidate creation unit 36 displays the migration target candidates based on the data stored in the src_vm_guests variable (S207).

Moreover, if information is not stored in the examination list (No in S202), the VM guest candidate creation unit 36 reads one VM guest from the examination list and stores the VM guest as a temporary variable in a memory or the like (S203).

Next, the VM guest candidate creation unit 36 identifies the power status of the VM guest stored in the temporary variable from the VM table 34c and determines whether or not the power status is normal (S204). The VM guest candidate creation unit 36 determines here that the power status of the VM guest is normal if not "unknown."

If the power status of the VM guest is normal (Yes in S204), the VM guest candidate creation unit 36 stores the VM guest as a migratable candidate in the src_vm_guests variable (S205), empties the temporary variable (S206), and then repeats the processes from S202 and onwards. On the other hand, if the power status of the VM guest is not normal (No in S204), the VM guest candidate creation unit 36 empties the temporary variable without making the VM guest a migratable candidate (S206), and then repeats the processes from S202 and onwards.

Flow of Migration Destination Candidate VM Host List Creation Process

Figure 16:
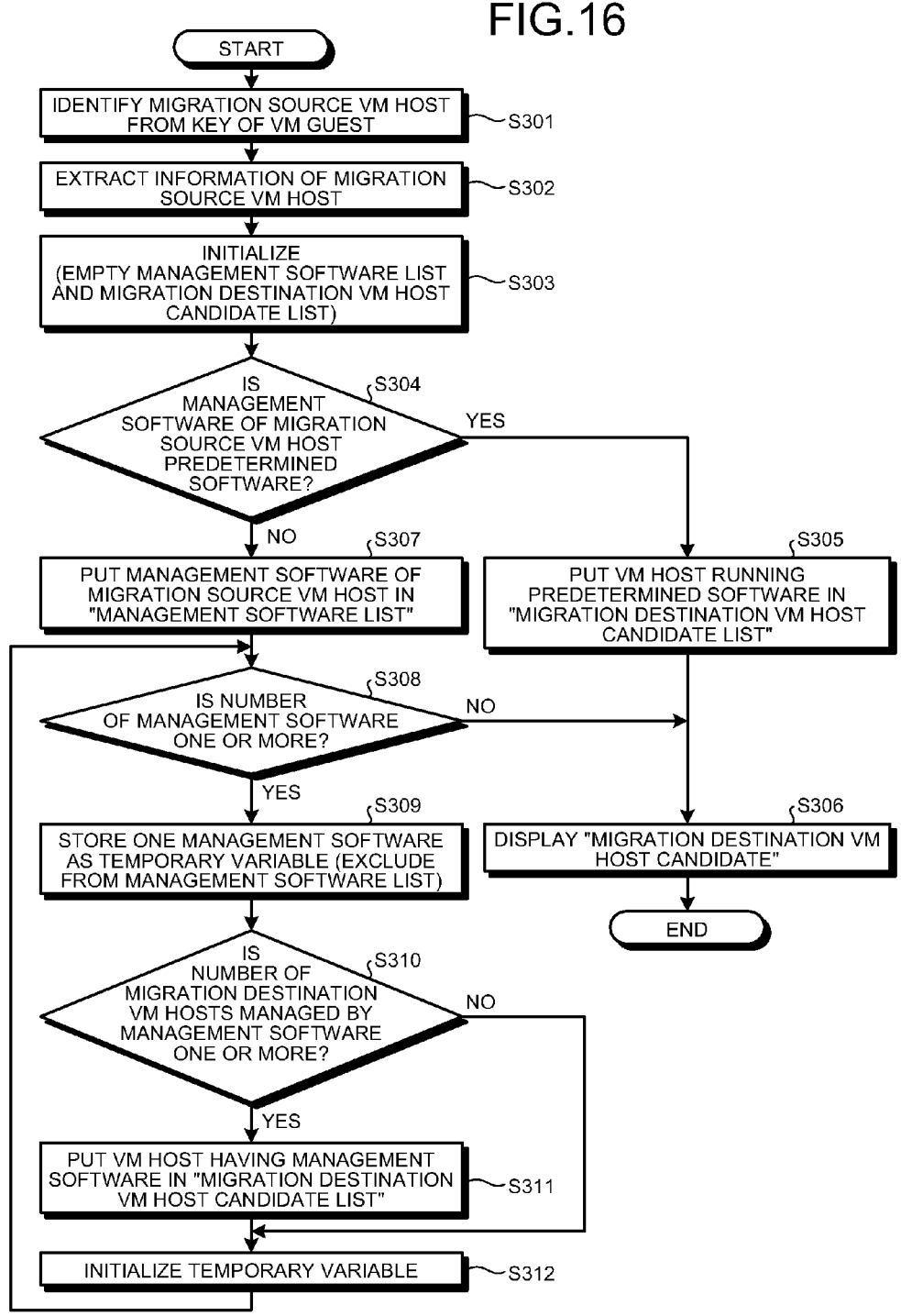
FIG. 16 is a flowchart explaining the flow of a migration destination candidate VM host list creation process.

FIG. 16 is a flowchart explaining the flow of the migration destination candidate VM host list creation process. The processes are executed in S106 to S107 illustrated in FIG. 14.

If the user selects a migration target VM guest, the migration destination candidate creation unit 37 acquires "Hash_key" associated with the VM guest and stored in the src_vm_guests variable as a key of the VM guest (S301). Next, the migration destination candidate creation unit 37 searches "ID" of the VM host table 34b with "Hash_key=2" as a key, and extracts "NAME=Host_b" and "api_type=API (B)" corresponding to "Hash_key=2" (S302).

The migration destination candidate creation unit 37 then executes initialization to empty a "management software list"

and the "migration destination VM host candidate list" being temporary buffers used to create the migration destination candidate VM host list (S303).

The migration destination candidate creation unit 37 subsequently determines whether or not "api_type" of the migration source VM host identified in S302 is predetermined management software (S304). If "api_type" of the migration source VM host is the predetermined management software (Yes in S304), then the migration destination candidate creation unit 37 identifies a VM host that runs the predetermined management software from the VM host table 34b and stores the VM host in the "migration destination VM host candidate list" (S305). At this point, the migration destination candidate creation unit 37 stores the information stored in the "migration destination VM host candidate list" also in the dst_vm_hosts variable. The migration destination candidate creation unit 37 subsequently displays the VM host stored in the "migration destination VM host candidate list" and the dst_vm_hosts variable as a migration destination target VM host on the client apparatus 10 (S306).

As an example of creating a migration destination VM host candidate after determining whether "api_type" is the predetermined management software, for example, it may be determined whether or not management software of the same manufacture as the migration source VM host is used. Moreover, it may be determined whether or not the platform of virtual software that provides a virtual environment is the same, in other words, whether or not a virtual environment is provided at a hardware level, a software level, or a language level. Moreover, as another example of the processes to be executed in S304 and S305, the migration destination candidate creation unit 37 may identify a VM host that runs the same management software as the management software of the migration source VM host.

On the other hand, if "api_type" of the migration source VM host is not the predetermined management software (No in S304), the migration destination candidate creation unit 37 stores the management software of the migration source VM host in the "management software list (S307). In other words, the migration destination candidate creation unit 37 identifies, from the server profile table 34e, management software that is installed and runs in the migration source VM host, and stores the management software in the "management software list."

If the number of management software stored in the "management software list" is one or more (Yes in S308), then the migration destination candidate creation unit 37 acquires one management software from the "management software list" and stores the management software in a temporary variable (S309). At this point, the migration destination candidate creation unit 37 deletes the management software stored in the temporary variable from the "management software list." If there is no management software stored in the "management software list" (No in S308), the migration destination candidate creation unit 37 executes S312.

Next, the migration destination candidate creation unit 37 determines whether or not the number of VM hosts managed by the management software stored in the temporary variable is one or more (S310). Specifically, the migration destination candidate creation unit 37 identifies a software group to which the management software stored in the temporary variable belongs from the management software table 34g. The migration destination candidate creation unit 37 then identifies a VM host that runs the management software belonging to the identified software group from the VM management table 34f and the VM table 34c. By doing so, the migration destination candidate creation unit 37 can identify a VM host that provides the same type of virtual environment as that of the migration source VM host.

If the number of VM hosts managed by the management software stored in the temporary variable is one or more (Yes in S310), then the migration destination candidate creation unit 37 stores the VM host(s) managed by the management software in the "migration destination VM host candidate list" (S311). At this point, the migration destination candidate creation unit 37 excludes the migration source VM host from the storage target. Moreover, the migration destination candidate creation unit 37 stores the information stored in the "migration destination VM host candidate list" also in the dst_vm_hosts variable.

The migration destination candidate creation unit 37 subsequently performs initialization to delete the information stored in the temporary variable (S312), and repeats the processes from S308 and onwards. Moreover, if determining in S310 that there is no VM host managed by the management software stored in the temporary variable (No in S310), the migration destination candidate creation unit 37 executes S312.

Flow of Migration Feasibility Determination Process

Figure 17:
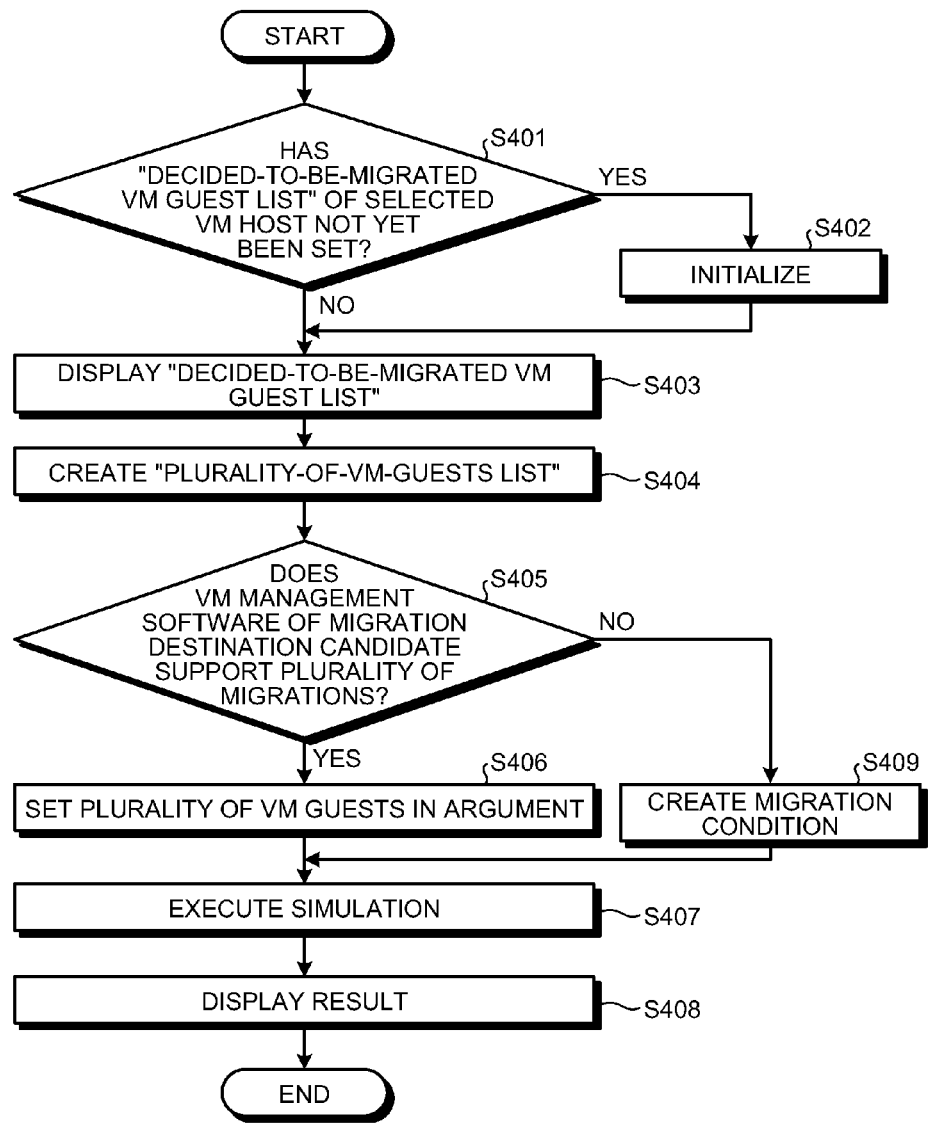
FIG. 17 is a flowchart explaining the flow of a migration feasibility determination process.

FIG. 17 is a flowchart explaining the flow of the migration feasibility determination process. The processes are executed in S108 to S109 illustrated in FIG. 14.

The migration determination unit 38 determines whether a "decided-to-be-migrated VM guest list" of the migration destination candidate VM host selected by the user from the migration destination candidate VM host list identified by the migration destination candidate creation unit 37 has not yet been set (S401). In other words, the migration determination unit 38 determines whether or not there exists the "decided-to-be-migrated VM guest list" indicating whether or not there exists another VM guest whose migration destination is the migration destination candidate VM host.

If the "decided-to-be-migrated VM guest list" has not yet been set (Yes in S401), then the migration determination unit 38 executes initialization of the "decided-to-be-migrated VM guest list" (S402). For example, the migration determination unit 38 deletes the data stored in the "decided-to-be-migrated VM guest list."

On the other hand, if the "decided-to-be-migrated VM gust list" has already been set (No in S401), the migration determination unit 38 transmits a screen where the "decided-to-be-migrated VM guest list" is displayed to the client apparatus 10 (S403). By doing so, the migration determination unit 38 can offer the user an opportunity to give the decided-to-be-migrated VM guest a second thought.

The migration determination unit 38 subsequently creates a "plurality-of-VM-guests list" organizing VM guests whose migration destination is the migration destination candidate VM host (S404). Next, the migration determination unit 38 determines whether or not VM management software running on the migration destination candidate VM host supports a plurality of migrations, using information such as "managings" stored in the VM management table 34f (S405).

If the VM management software supports a plurality of migrations (Yes in S405), then the migration determination unit 38 sets a plurality of VM guests in an argument such as the migration command (S406), and executes a simulation (S407). The migration determination unit 38 subsequently transmits a screen where the simulation result is displayed to the client apparatus 10 (S408). For example, the migration determination unit 38 executes an arbitrary simulation as in simultaneously or successively executing the migrations of the plurality of VM guests to the same VM host, or determining whether or not a next migration is feasible in a state where a previously decided VM guest has been migrated. The migration determination unit 38 executes the issuance of a comparison command of a resource status as a determination method by a simulation.

On the other hand, if the VM management software does not support a plurality of migrations (No in S405), the migration determination unit 38 creates one VM list where the resources of the VM guests are added as a migration condition (S409). The migration determination unit 38 then determines whether or not the migration condition can be migrated in the migration destination candidate VM guest from S407 and onwards.

Flow of Migration Type Decision Process

Figure 18:
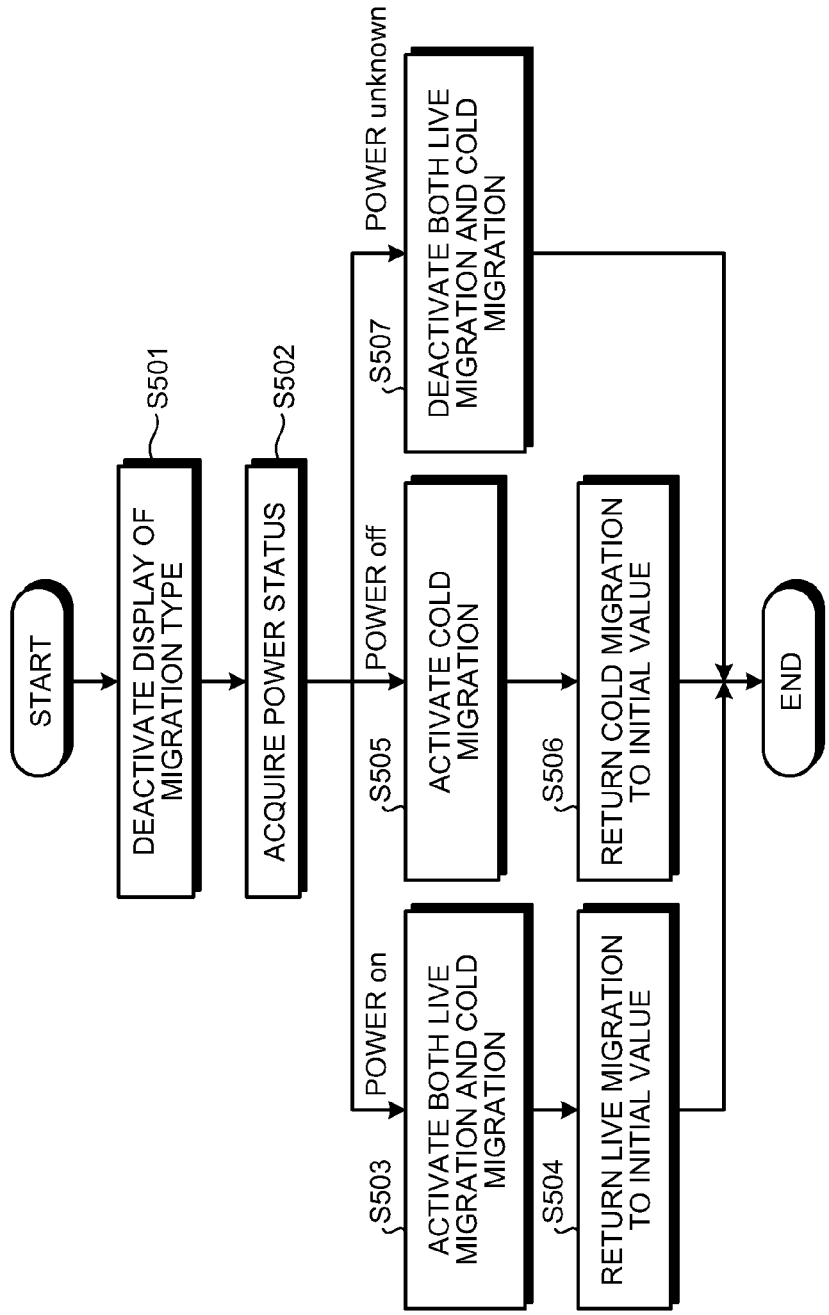
FIG. 18 is a flowchart explaining the flow of a migration type decision process.

FIG. 18 is a flowchart explaining the flow of the migration type decision process. The process is executed in S110 illustrated in FIG. 14. The process is executed for each VM guest whose migration destination has been decided. An example will be described here in which the migration type decision unit 39 decides a migration type appropriate for a migration target VM guest. However, a decision on the migration type is not limited to this. For example, it is also possible to display the migration types appropriate for the user and allow the user to make a final decision on the migration type.

Firstly, if a migration target VM guest and a migration destination VM host are decided by the migration determination unit 38, the migration type decision unit 39 deactivates the migration type on the screen displayed on the client apparatus 10 (S501). In other words, the migration type decision unit 39 puts the "Cold Migration" field and the "Live Migration" field on the screen illustrated in FIG. 13 in a deactivated state.

Next, the migration type decision unit 39 identifies the power status of the migration target VM guest from the VM table 34c (S502). If the power status of the VM guest is "ON," then the migration type decision unit 39 activates both of the "Cold Migration" field and the "Live Migration" field (S503). The migration type decision unit 39 subsequently displays an icon of the VM guest in the "Live Migration" field (S504).

Moreover, if the power status of the VM guest is "OFF," the migration type decision unit 39 activates the "Cold Migration" field (S505). The migration type decision unit 39 subsequently displays an icon of the VM guest in the "Cold Migration" field (S506).

Moreover, if the power status of the VM guest is "unknown," the migration type decision unit 39 deactivates both of the "Cold Migration" field and the "Live Migration" field (S507). In other words, the migration type decision unit 39 determines that the VM guest is not migratable.

If the migration type has been decided by S502 to S506, the migration type decision unit 39 acquires "Hash_key" representing a migration destination VM host, "ID" representing a migration target VM guest, and "migration_type" representing a migration type from the tables and the variables. The migration type decision unit 39 then associates the acquired pieces of information and stores them in the migration_lists variable.

Screen Transition Example

Next, a description will be given of a specific example of a screen to be transmitted by the migration management apparatus 30 to the client apparatus 10. A description will be given here, as specific example 1, of an example of deciding a migration target VM guest to decide a migration destination, and subsequently deciding a migration type using FIGS. 19 to 24. Moreover, a description will be given, as specific example 2, of an example of deciding migration destinations of a plurality of VM guests using FIGS. 25 to 40. The basic configuration of screens described in the specific examples is similar to FIG. 13. In other words, screen examples described in the specific examples include the "Source VM Host List" field, the "Source VM Guest List" field, the "Target VM Host List" field, the "Cold Migration" field, and the "Live Migration" field. Furthermore, the screen examples described in the specific examples include the "OK" button and the "Cancel" button.

Specific Example 1

Figure 19:
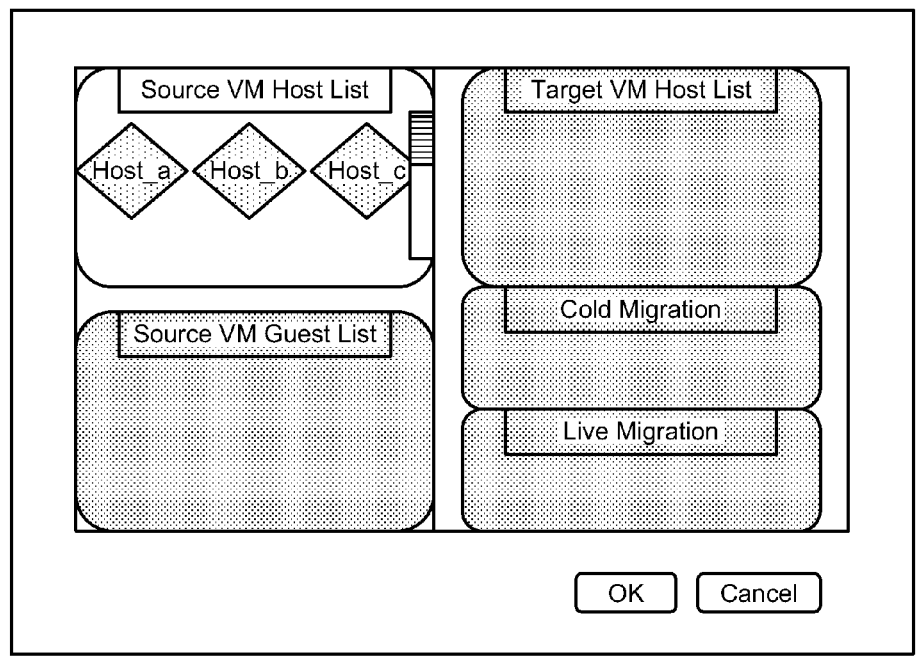
FIG. 19 is a diagram illustrating a top screen example.
Figure 20:
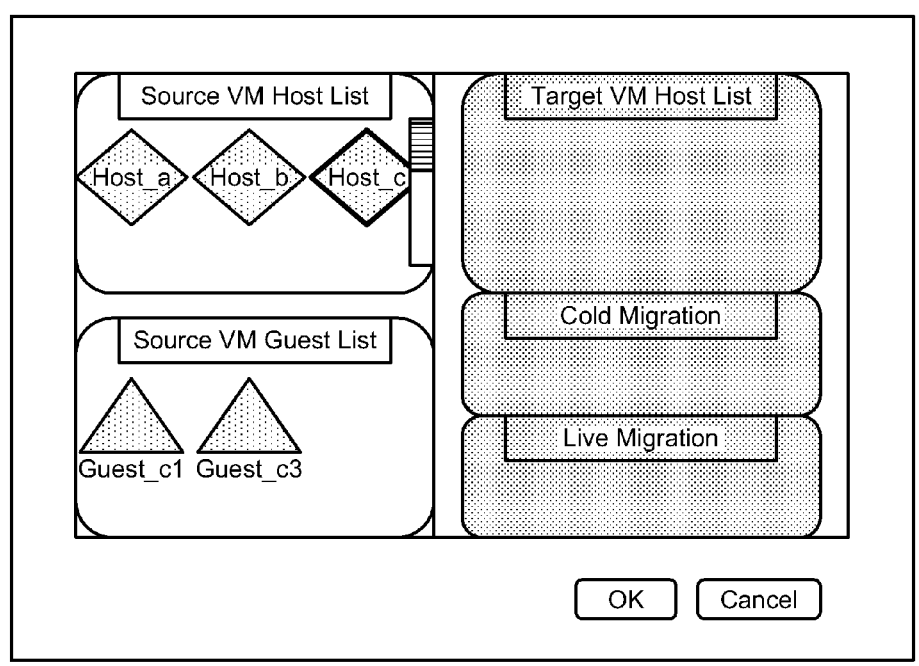
FIG. 20 is a diagram illustrating a screen example where a migration target VM guest list is being displayed.
Figure 21:
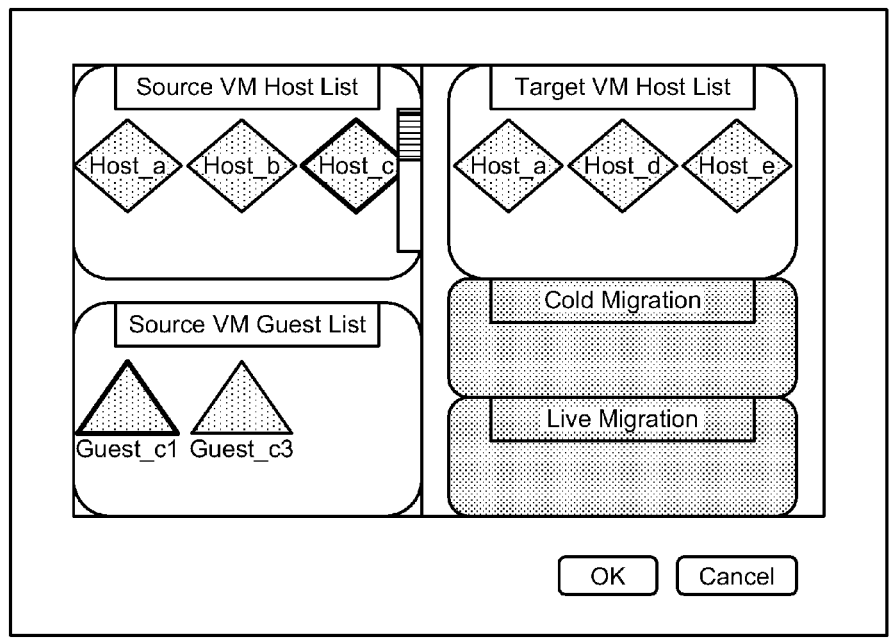
FIG. 21 is a diagram illustrating a screen example where a migration destination candidate VM host list is being displayed.
Figure 22:
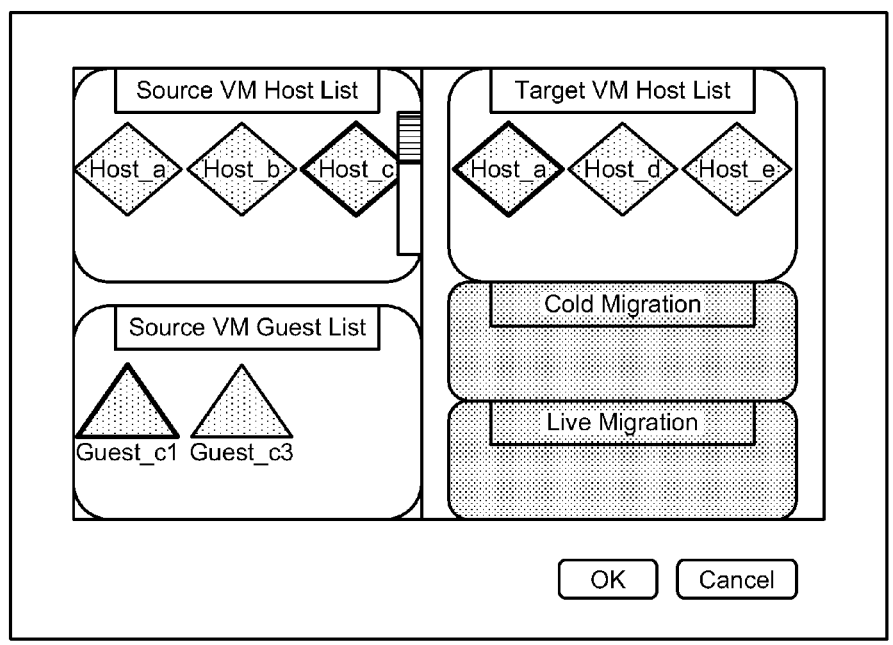
FIG. 22 is a diagram illustrating a screen example where one VM host has been selected as a migration destination candidate.
Figure 23:
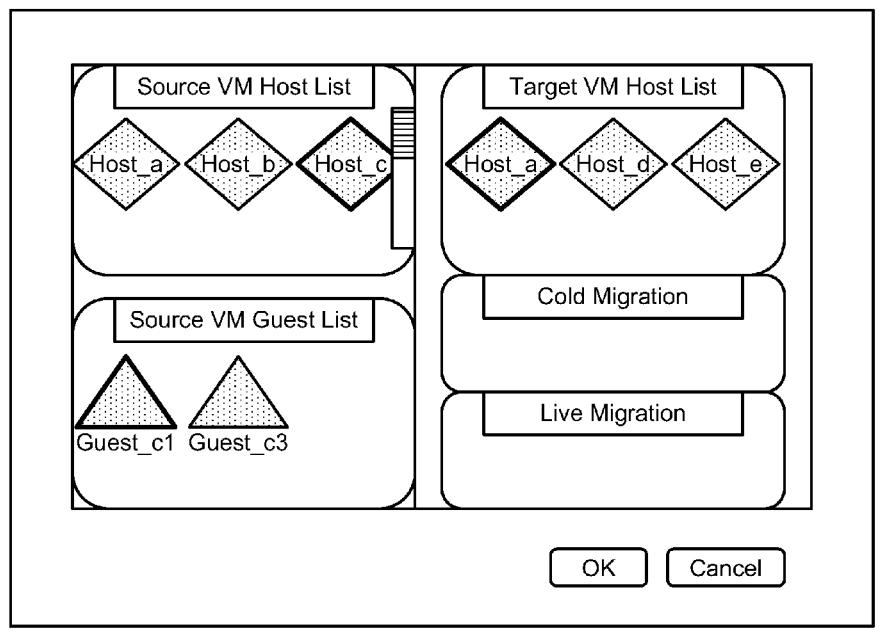
FIG. 23 is a diagram illustrating a screen example where a migration destination VM host has been decided.
Figure 24:
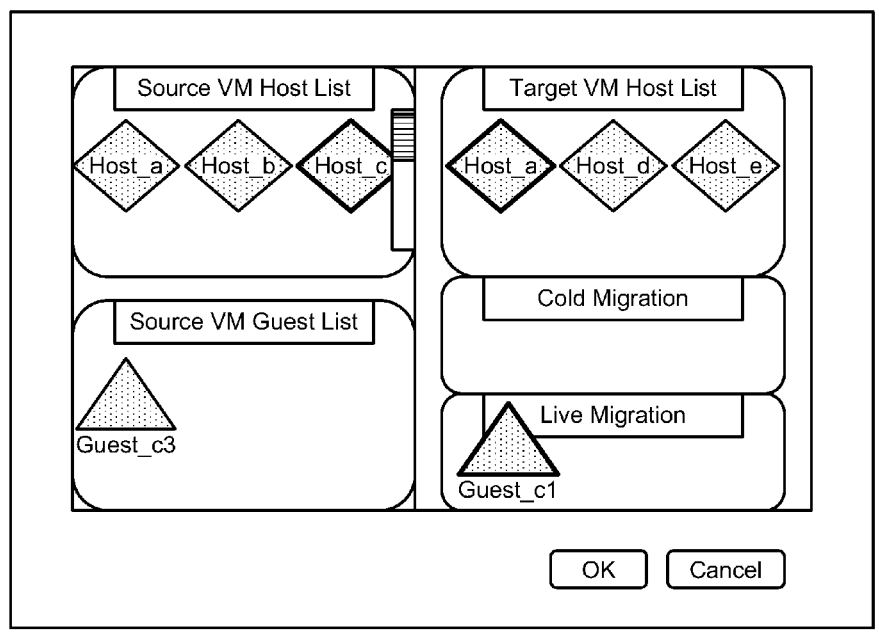
FIG. 24 is a diagram illustrating a screen example where a migration type has been decided.

FIG. 19 is a diagram illustrating a top screen example. FIG. 20 is a diagram illustrating a screen example where a migration target VM guest list is being displayed. FIG. 21 is a diagram illustrating a screen example where a migration destination candidate VM host list is being displayed. FIG. 22 is a diagram illustrating a screen example where one VM host has been selected as a migration destination candidate. FIG. 23 is a diagram illustrating a screen example where a migration destination VM host has been decided. FIG. 24 is a diagram illustrating a screen example where a migration type has been decided.

When the instruction to start the migration process of the VM guest, the instruction having been transmitted from the client apparatus 10, is accepted by the communication control I/F unit 31 and the like, the VM host creation unit 35 of the migration management apparatus 30 transmits the top screen illustrated in FIG. 19 to the client apparatus 10. Specifically, the VM host creation unit 35 transmits to the client apparatus 10 a screen where the VM host names (NAME) acquired from the VM host table 34b and the like are displayed in the "Source VM Host List" field on the screen having the fields illustrated in FIG. 13. It is assumed here that the VM host creation unit 35 displays "Host_a," "Host_b," and "Host_c."

Next, if "Host_c" is selected by the client apparatus 10 in the screen example of FIG. 19, the VM guest candidate creation unit 36 decides a migration source VM host to be "Host_c." Next, the VM guest candidate creation unit 36 refers to the tables and extracts "Guest_c1" and "Guest_c3" as VM guests running on "Host_c." The VM guest candidate creation unit 36 then transmits to the client apparatus 10 a screen where "Guest_c1" and "Guest_c3" are displayed in the "Source VM Guest List" field as illustrated in FIG. 20.

If "Guest_c1" is subsequently selected on the client apparatus 10 in the screen example of FIG. 20, the migration destination candidate creation unit 37 refers to the tables and identifies another VM host that runs the same type of or the same VM management software as the migration source VM host "Host_c." Next, the migration destination candidate creation unit 37 transmits to the client apparatus 10 a screen where "Host_a," "Host_d," and "Host_e" are displayed as migration destination candidate VM hosts in the "Target VM Host List" field as illustrated in FIG. 21.

If "Host_a" is selected by the client apparatus 10 in this state as illustrated in FIG. 22, the migration determination unit 38 determines by a migration simulation whether or not the migration target VM guest "Guest_c1" is migratable to "Host_a." If the migration determination unit 38 determines that "Guest_c1" is migratable, then the migration type decision unit 39 identifies that the power status of the VM guest "Guest_c" is "ON" from the VM guest table 34d. The migration type decision unit 39 subsequently transmits to the client apparatus 10 a screen in a state where the "Cold Migration" field and the "Live Migration" field have been activated as illustrated in FIG. 23. In the screen example in this state is a state where "Host_c" in the "Source VM Host List" field, "Guest_c1" in the "Source VM Guest List" field, and "Host_a" in the "Target VM Host List" field have been selected.

The migration type decision unit 39 subsequently transmits to the client apparatus 10 a screen where "Guest_c" is displayed in the "Live Migration" field as illustrated in FIG. 24 since the power status of the VM guest "Guest_c" is "ON." If the migration types of the VM guests are decided in this manner and then "OK" is clicked, the migration instruction unit 40 refers to the migration_lists variable and transmits to the VM management apparatus an instruction to start the migration of "Guest_c" displayed in the "Live Migration" field. The VM management apparatus then transmits a live migration instruction to each of the migration source VM hosts and the migration destination VM hosts.

Specific Example 2

Figure 25:
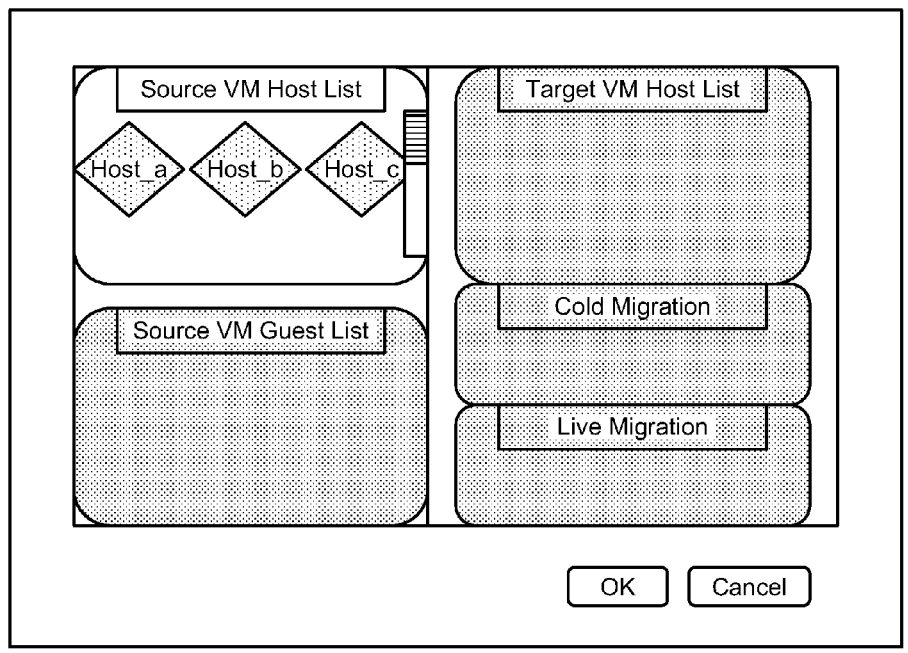
FIG. 25 is a diagram illustrating a top screen example.
Figure 26:
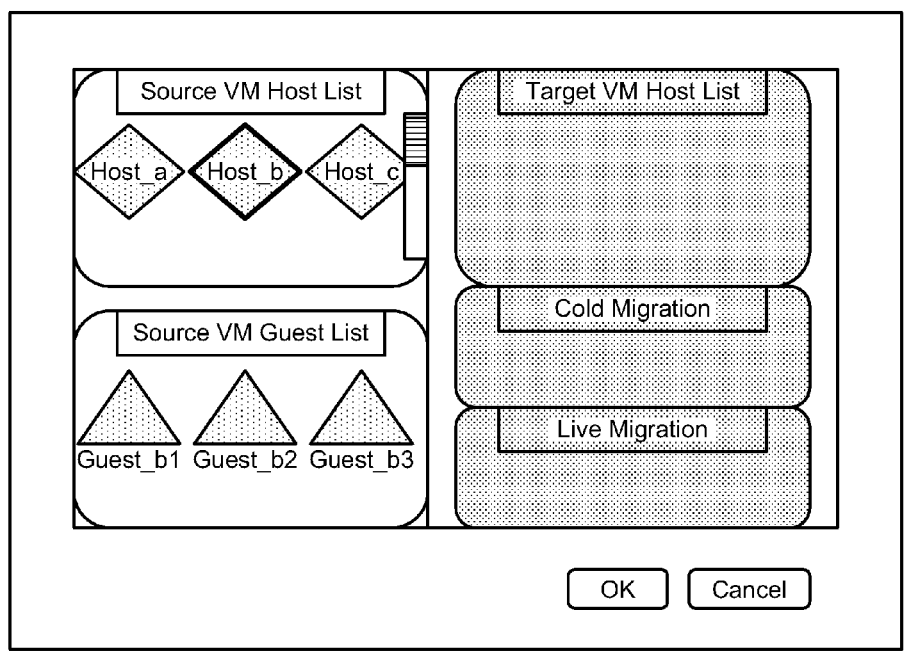
FIG. 26 is a diagram illustrating a screen example where the migration target VM guest list is being displayed.
Figure 27:
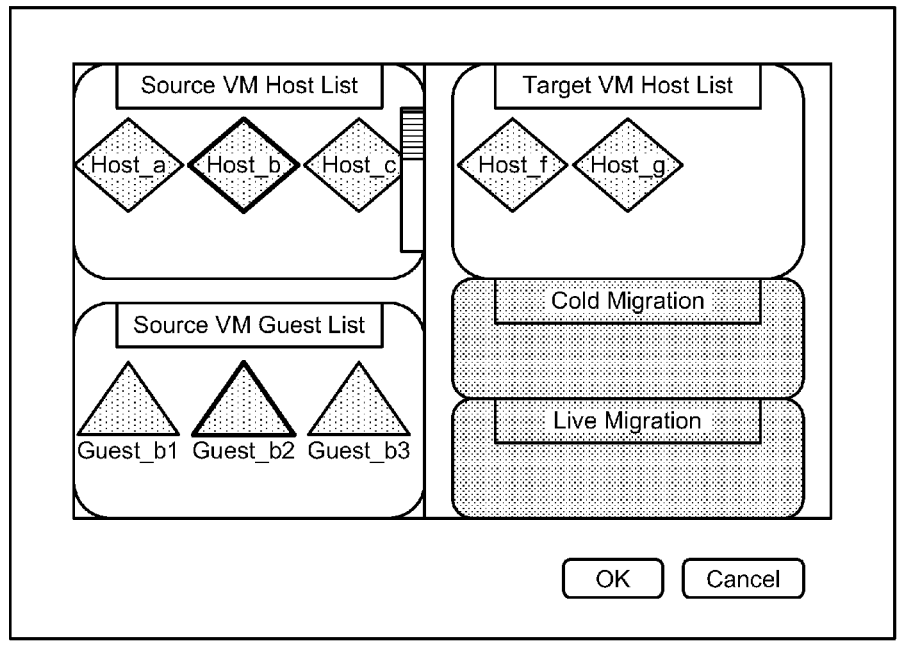
FIG. 27 is a diagram illustrating a screen example where the migration destination candidate VM host list is being displayed.
Figure 28:
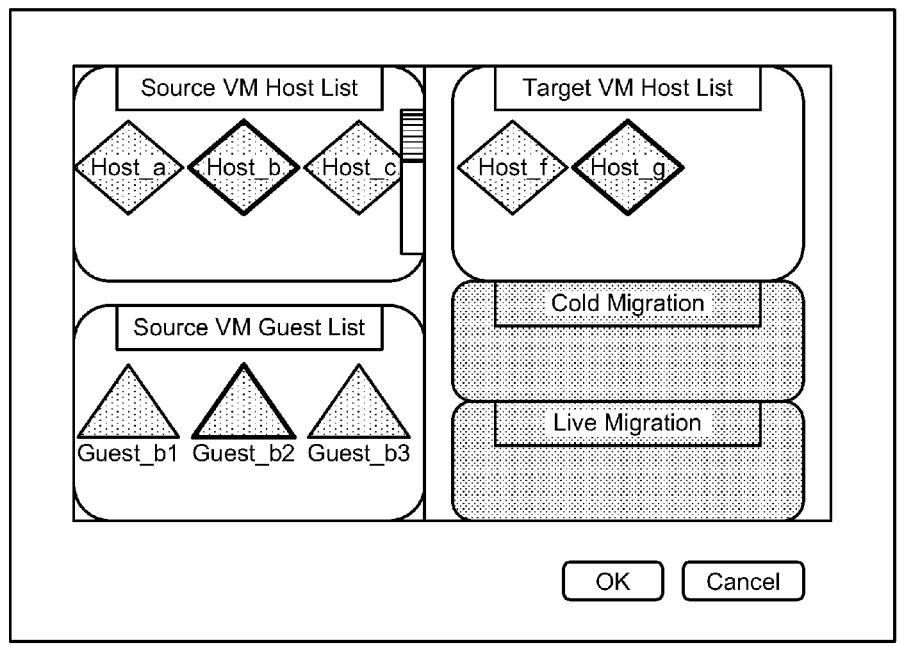
FIG. 28 is a diagram illustrating a screen example where one VM host has been selected as a migration destination candidate.
Figure 29:
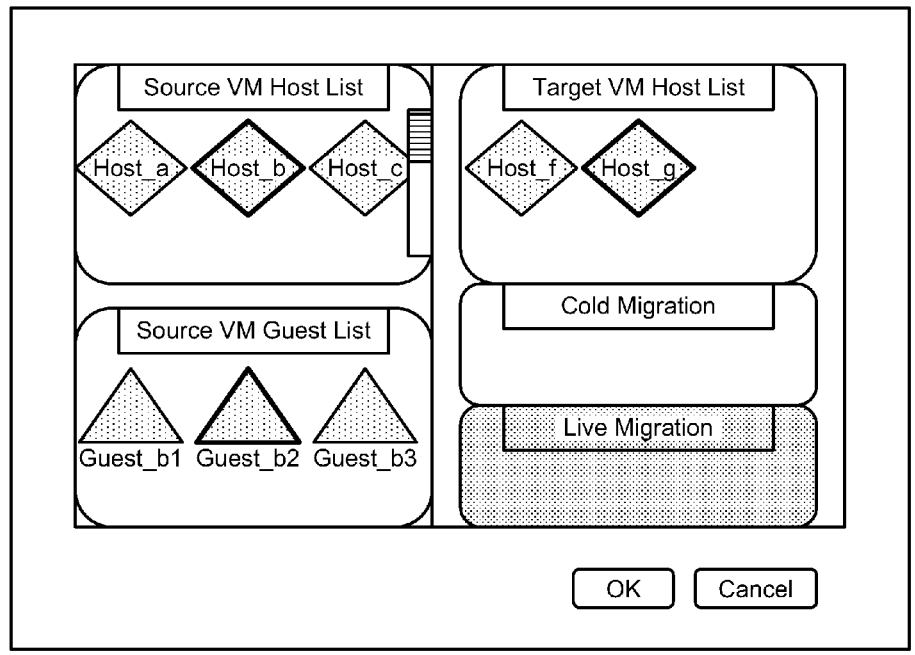
FIG. 29 is a diagram illustrating a screen example where a migration destination VM host has been decided.
Figure 30:
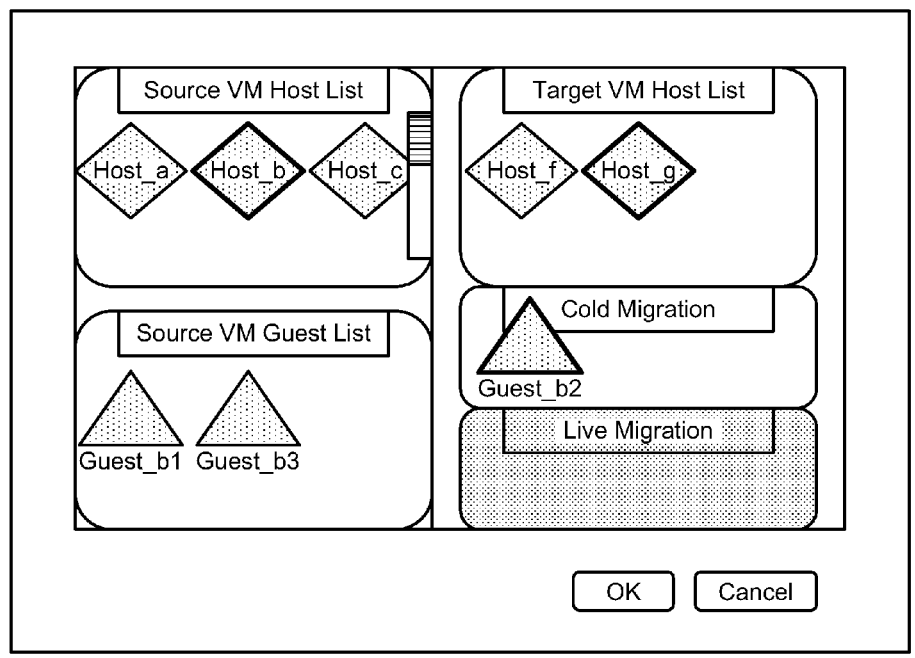
FIG. 30 is a diagram illustrating a screen example where the migration type has been decided.

FIG. 25 is a diagram illustrating a top screen example. FIG. 26 is a diagram illustrating a screen example where a migration target VM guest list is being displayed. FIG. 27 is a diagram illustrating a screen example where a migration destination candidate VM host list is being displayed. FIG. 28 is a diagram illustrating a screen example where one VM host has been selected as a migration destination candidate. FIG. 29 is a diagram illustrating a screen example where a migration destination VM host has been decided. FIG. 30 is a diagram illustrating a screen example where the migration type has been decided.

Figure 31:
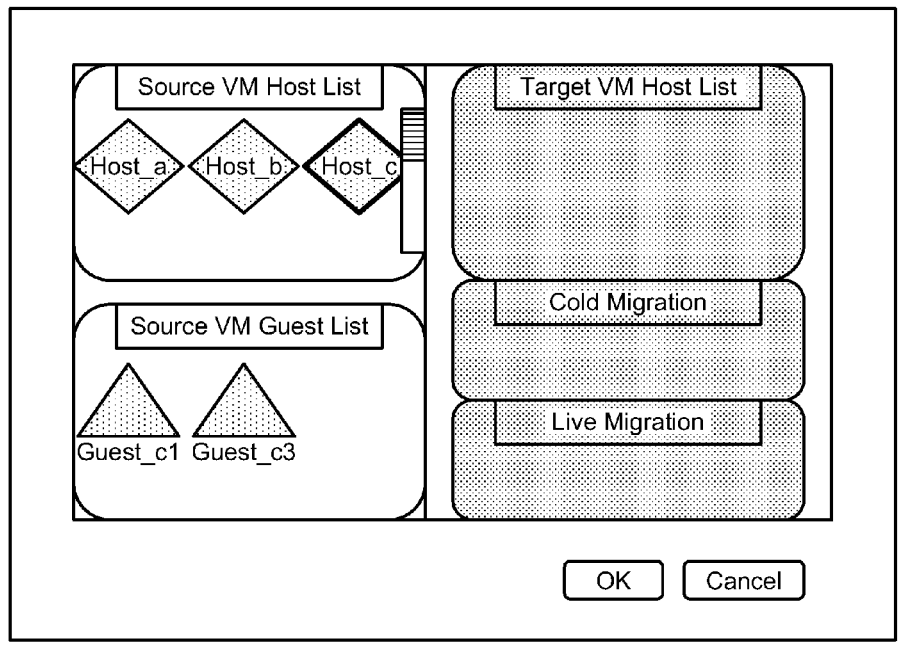
FIG. 31 is a diagram illustrating a screen example where another migration source VM host has been selected in a state where the migration of another VM guest was already decided.
Figure 32:
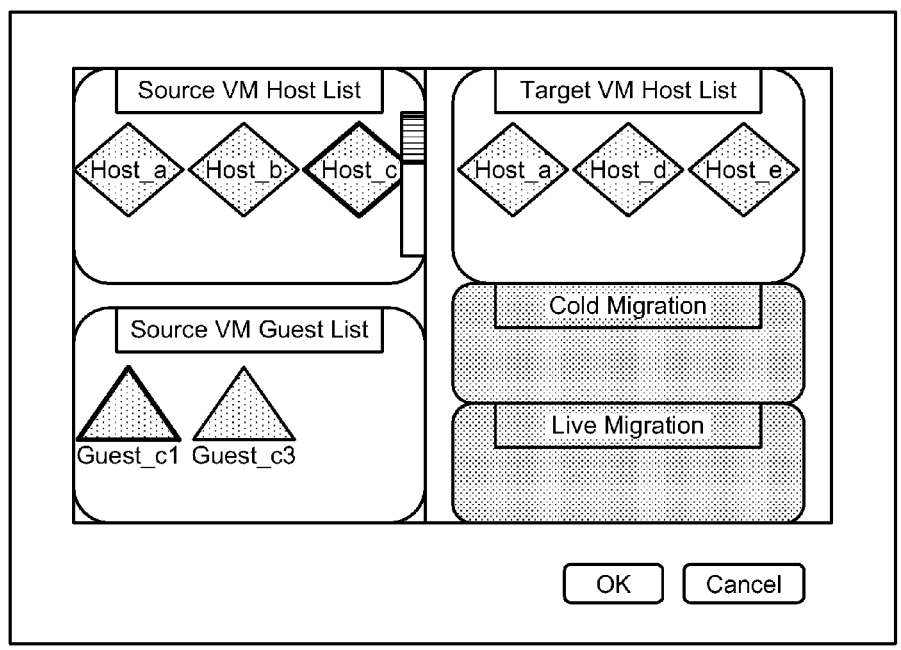
FIG. 32 is a diagram illustrating a screen example where a migration target VM guest has been selected from the state of FIG. 31.
Figure 33:
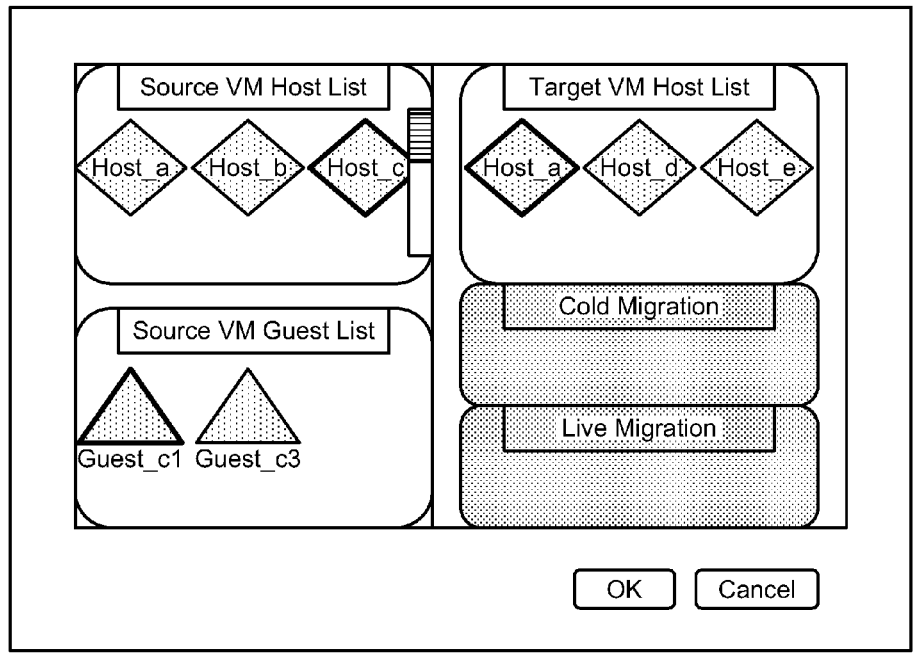
FIG. 33 is a diagram illustrating a screen example where a migration destination candidate VM host has been selected from the state of FIG. 32.
Figure 34:
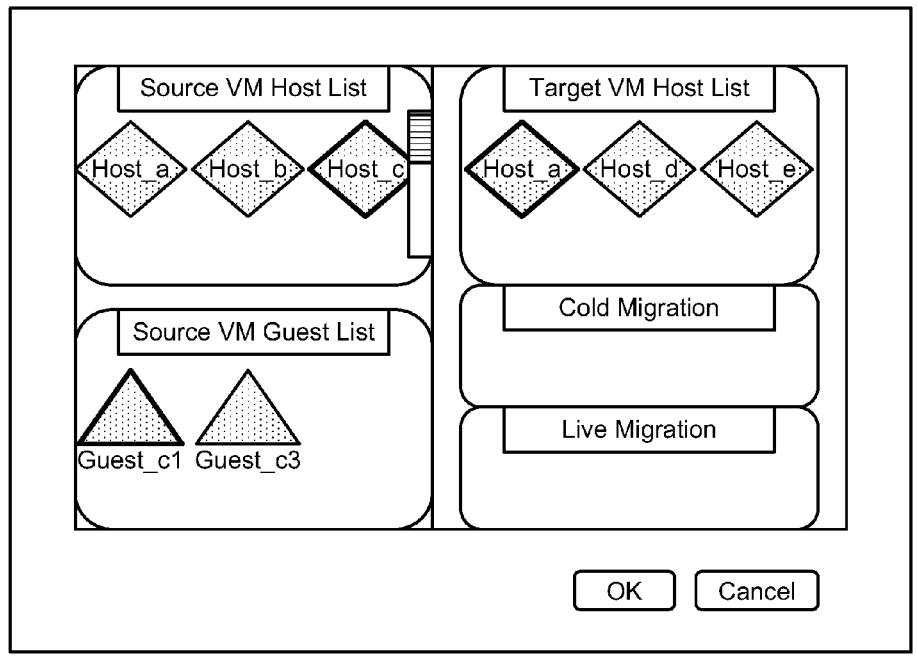
FIG. 34 is a diagram illustrating a screen example where a migration destination VM host has been decided from the state of FIG. 33.
Figure 35:
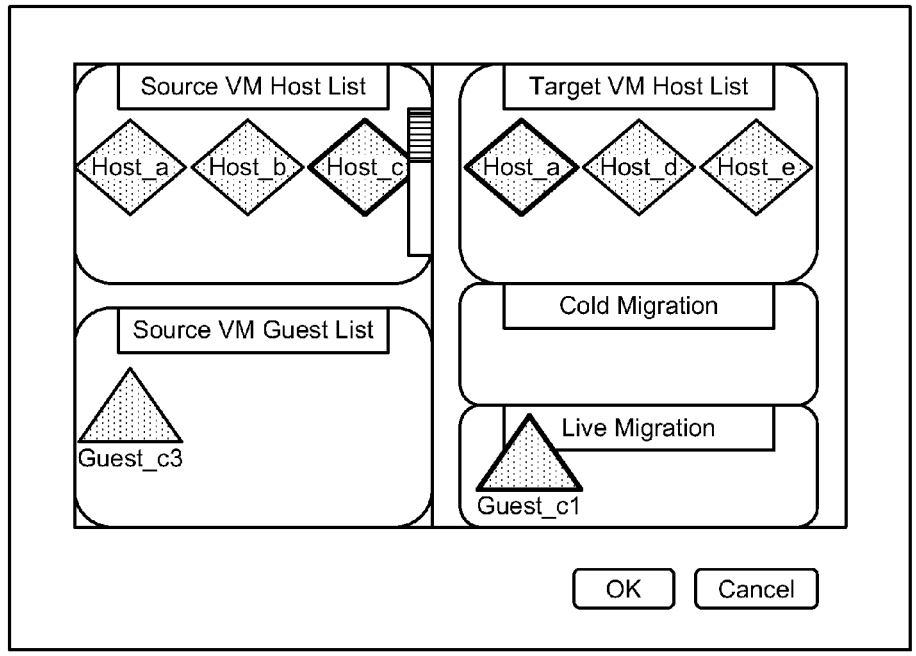
FIG. 35 is a diagram illustrating a screen example where the migration type has been decided from the state of FIG. 34.

FIG. 31 is a diagram illustrating a screen example where another migration source VM host has been selected in a state where the migration of another VM guest was already decided. FIG. 32 is a diagram illustrating a screen example where a migration target VM guest has been selected from the state of FIG. 31. FIG. 33 is a diagram illustrating a screen example where a migration destination candidate VM host has been selected from the state of FIG. 32. FIG. 34 is a diagram illustrating a screen example where a migration destination VM host has been decided from the state of FIG. 33. FIG. 35 is a diagram illustrating a screen example where the migration type has been decided from the state of FIG. 34.

Figure 36:
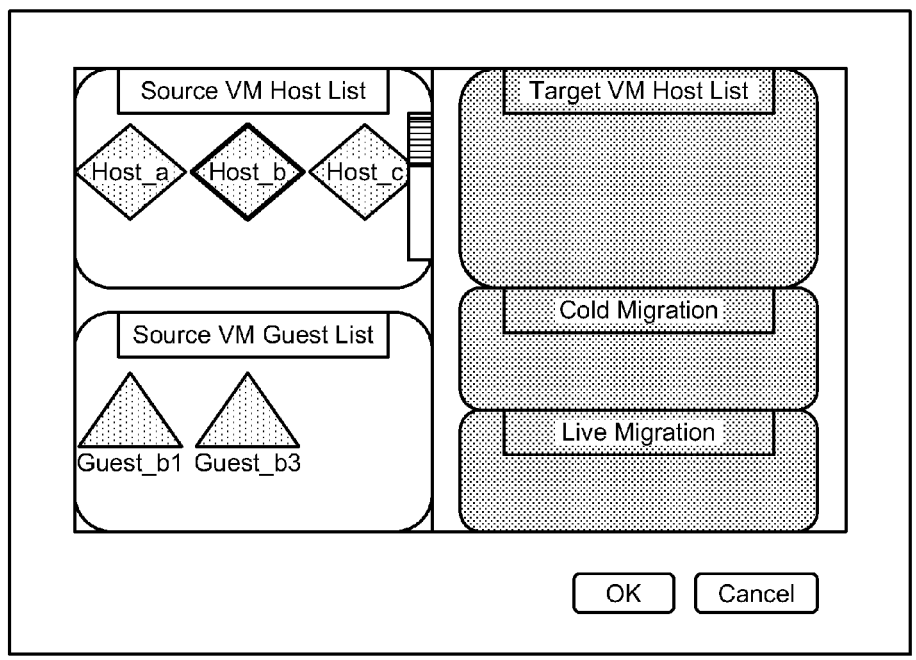
FIG. 36 is a diagram illustrating a screen example where a migration destination of still another VM guest is subsequently decided from the state of FIG. 35.
Figure 37:
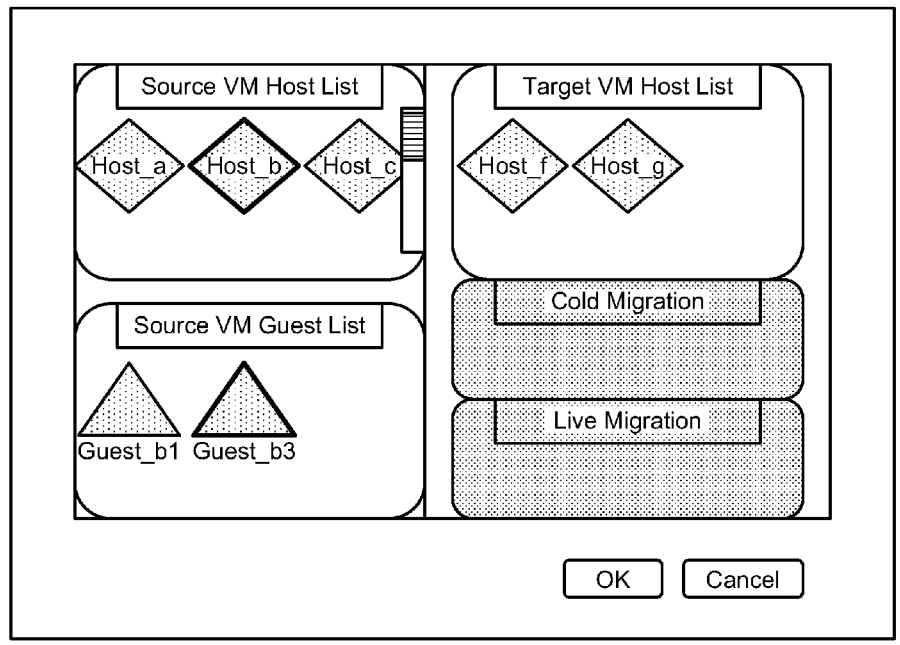
FIG. 37 is a diagram illustrating a screen example where a migration destination target VM guest has been selected from the state of FIG. 36.
Figure 38:
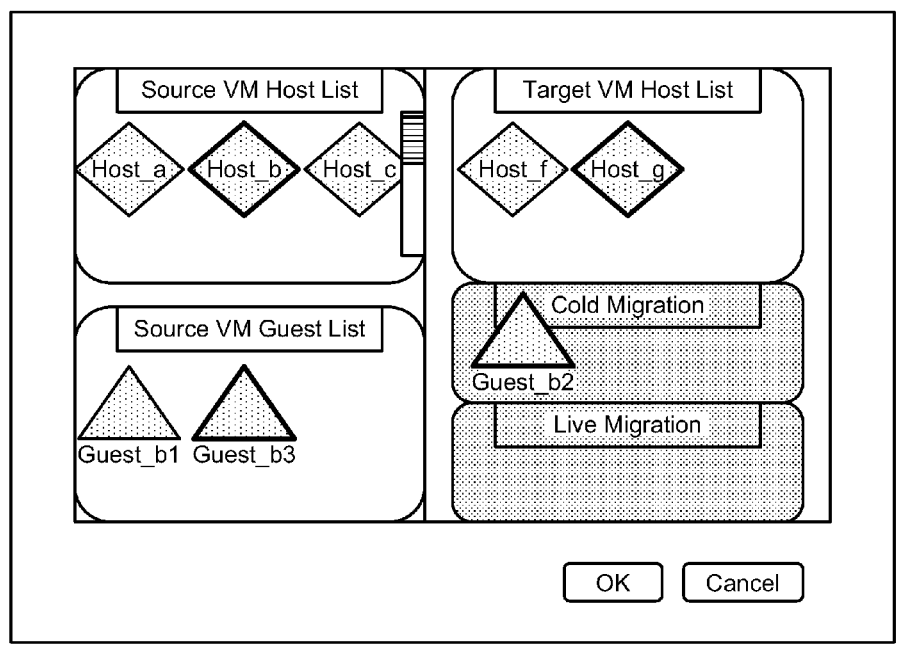
FIG. 38 is a diagram illustrating a screen example where another VM guest has already been decided to be migrated to the VM host selected as the migration destination candidate.
Figure 39:
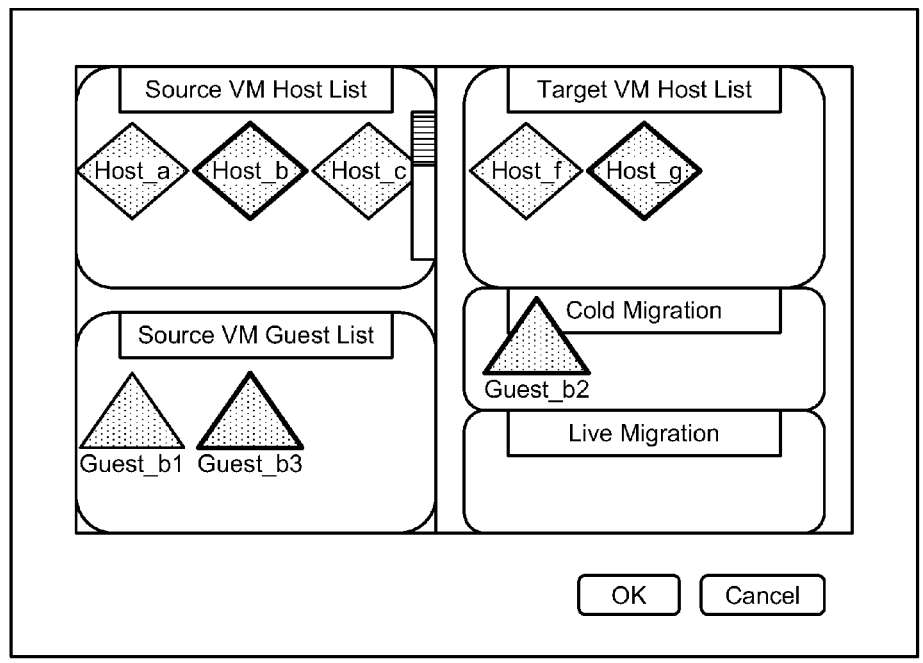
FIG. 39 is a diagram illustrating a screen example where the migration type has been decided from the state of FIG. 38.
Figure 40:
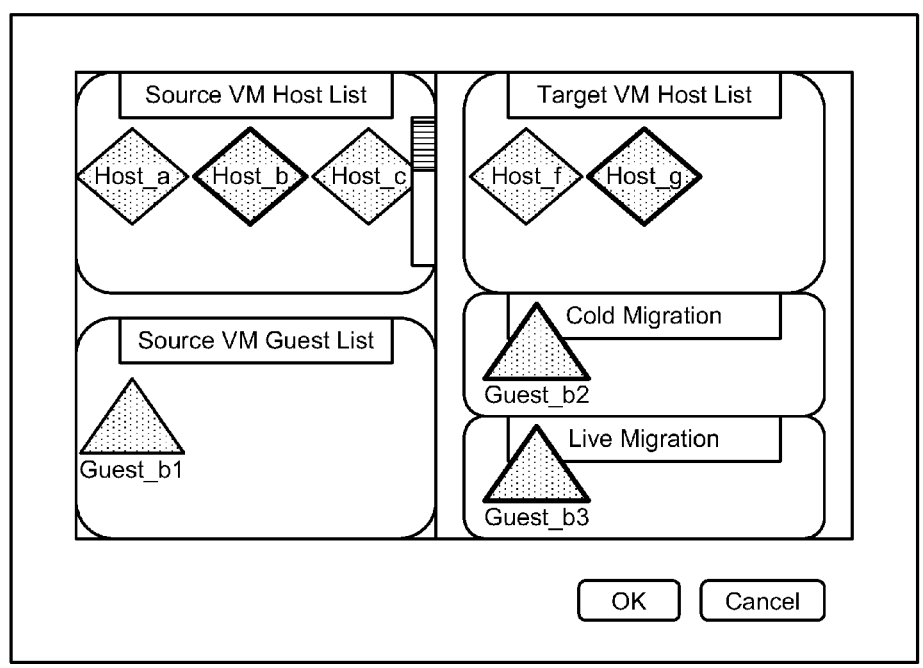
FIG. 40 is a diagram illustrating a screen example where a plurality of VM guests has been decided to be migrated to one VM host.

FIG. 36 is a diagram illustrating a screen example where a migration destination of still another VM guest is subsequently decided from the state of FIG. 35. FIG. 37 is a diagram illustrating a screen example where a migration target VM guest has been selected from the state of FIG. 36. FIG. 38 is a diagram illustrating a screen example where another VM guest has already been decided to be migrated to the VM host selected as the migration destination candidate. FIG. 39 is a diagram illustrating a screen example where the migration type has been decided from the state of FIG. 38. FIG. 40 is a diagram illustrating a screen example where a plurality of VM guests has been decided to be migrated to one VM host.

When an instruction to start the migration process of a VM guest, the instruction having been transmitted from the client apparatus 10, is accepted by the communication control I/F unit 31 and the like, the VM host creation unit 35 of the migration management apparatus 30 transmits the top screen illustrated in FIG. 25 to the client apparatus 10. Specifically, the VM host creation unit 35 transmits to the client apparatus 10 a screen where VM host names (NAME) acquired from the VM host table 34b and the like are displayed in the "Source VM Host List" field. It is assumed here that the VM host creation unit 35 displays "Host_a," "Host_b," and "Host_c."

Next, if "Host_b" is selected by the client apparatus 10 in the screen example of FIG. 25, the VM guest candidate creation unit 36 decides the migration source VM host to be "Host_b." Next, the VM guest candidate creation unit 36 refers to the tables and extracts "Guest_b1," "Guest_b2," and "Guest_b3" as VM guests running on "Host_b." The VM guest candidate creation unit 36 then transmits to the client apparatus 10 a screen where "Guest_b1," "Guest_b2," and "Guest_b3" are displayed in the "Source VM Guest List" field as illustrated in FIG. 26.

If "Guest_b2" is subsequently selected on the client apparatus 10 in the screen example of FIG. 26, the migration destination candidate creation unit 37 refers to the tables and identifies another VM host that runs the same type of or the same VM management software as the migration source VM host "Host_b." Next, the migration destination candidate creation unit 37 transmits to the client apparatus 10 a screen where "Host_f" and "Host_g" are displayed as the migration destination candidate VM hosts in the "Target VM Host List" field as illustrated in FIG. 27.

If "Host_g" is selected by the client apparatus 10 in this state as illustrated in FIG. 28, the migration determination unit 38 determines by a migration simulation whether or not the migration target VM guest "Guest_b2" is migratable to "Host_g." If the migration determination unit 38 determines that "Guest_b2" is migratable, then the migration type decision unit 39 transmits to the client apparatus 10 a screen where the field has been activated based on the power status of the migration target VM guest "Guest_b2."

Here, the migration type decision unit 39 identifies from the VM guest table 34d that the power status of the VM guest "Guest_b2" is "OFF." The migration type decision unit 39 then transmits to the client apparatus 10 a screen in the state where the "Cold Migration" field has been activated as illustrated in FIG. 29. The migration type decision unit 39 subsequently transmits to the client apparatus 10 a screen where "Guest_b2" whose VM guest power status is "OFF" is displayed in the "Cold Migration" field as illustrated in FIG. 30.

Next, if "Host_c" in the "Source VM Host List" field is selected on the client apparatus 10 from the state of FIG. 30, the VM guest candidate creation unit 36 decides the migration source VM host to be "Host_c." Next, the VM guest candidate creation unit 36 refers to the tables and extracts "Guest_c1" and "Guest_c3" as VM guests running on "Host_c." The VM guest candidate creation unit 36 then transmits to the client apparatus 10 a screen where "Guest_c1" and "Guest_c3" are displayed in the "Source VM Guest List" field as illustrated in FIG. 31.

If "Guest_c1" is subsequently selected by the client apparatus 10 in the screen example of FIG. 31, the migration destination candidate creation unit 37 refers to the tables and identifies another VM host that runs the same type of or the same VM management software as the migration source VM host "Host_c." Next, the migration destination candidate creation unit 37 transmits to the client apparatus 10 a screen where "Host_a," "Host_d," and "Host_e" are displayed as migration destination candidate VM hosts in the "Target VM Host List" field as illustrated in FIG. 32.

If "Host_a" is selected on the client apparatus 10 in this state as illustrated in FIG. 33, the migration determination unit 38 determines by a migration simulation whether or not the migration target VM guest "Guest_c1" is migratable to "Host_a." If the migration determination unit 38 determines that "Guest_c1" is migratable, then the migration type decision unit 39 transmits to the client apparatus 10 a screen where the fields have been activated based on the power status of the migration target VM guest "Guest_c1." Here, the migration type decision unit 39 identifies that the power status of the VM guest "Guest_c1" is "ON" from the VM guest table 34d. The migration type decision unit 39 then transmits to the client apparatus 10 a screen in a state where the "Cold Migration" field and the "Live Migration" field have been activated as illustrated in FIG. 34.

The migration type decision unit 39 subsequently transmits to the client apparatus 10 a screen where "Guest_c1" is displayed in the "Live Migration" field since the power status of the VM guest "Guest_c1" is "ON" as illustrated in FIG. 35. In other words, in the state thus far, the migration management apparatus 30 has been decided to migrate "Guest_b2" that runs on the VM host "Host_b" to "Host_g" by "cold migration." Furthermore, the migration management apparatus 30 has been decided to migrate "Guest_c1" that runs on the VM host "Host_c" to "Host_a" by "live migration."

Furthermore, if "Host_b" in the "Source VM Host List" field is subsequently selected on the client apparatus 10 from the state of FIG. 35 as illustrated in FIG. 36, the VM guest candidate creation unit 36 decides the migration source VM host to be "Host_b." Next, the VM guest candidate creation unit 36 refers to the tables and extracts "Guest_b1" and "Guest_b3" as VM guests running on "Host_b." The VM guest candidate creation unit 36 then transmits to the client apparatus 10 a screen where "Guest_b1" and "Guest_b3" are displayed in the "Source VM Guest List" field as illustrated in FIG. 36. It is assumed here that the client apparatus 10 has selected "Guest_b3."

The VM guest candidate creation unit 36 excludes "Guest_b2" from migration targets even if "Host_b" is selected as a migration source since the migration destination of "Guest_b2" has already been decided.

If "Guest_b3" is subsequently selected on the client apparatus 10, the migration destination candidate creation unit 37 refers to the tables and identifies another VM host that runs the same type of or the same VM management software as the migration source VM host "Host_b." In other words, the migration destination candidate creation unit 37 transmits to the client apparatus 10 a screen where "Host_f" and "Host_g" are displayed as the migration destination candidate VM hosts in the "Target VM Host List" field as illustrated in FIG. 37.

If "Host_g" is selected on the client apparatus 10 in this state as illustrated in FIG. 38, the migration determination unit 38 determines by a migration simulation whether or not the migration target VM guest "Guest_b3" is migratable to "Host_g."

At this point, "Host_g" has already been decided as the migration destination of "Guest_b2" and accordingly, if the client apparatus 10 selects "Host_g," the migration determination unit 38 transmits to the client apparatus 10 a screen where "Guest_b2" is displayed in the "Cold Migration" field. Moreover, "Host_g" was selected as a new migration destination candidate of "Guest_b3" in the state where "Host_g" had been decided as a migration destination of "Guest_b2" and accordingly the migration determination unit 38 determines whether or not both are migratable. The description of the determination method was given in the configuration and the like and accordingly will be omitted. Moreover, since the power status of "Guest_b3" has not been identified in the state of FIG. 38, the migration determination unit 38 displays "Guest_b2" in the "Cold Migration" field in a state where the "Cold Migration" field and the "Live Migration" field have been deactivated.

If the migration determination unit 38 determines that "Guest_b3" is migratable, then the migration type decision unit 39 transmits to the client apparatus 10 a screen where the fields have been activated based on the power status of the migration target VM guest "Guest_b3." The power status of the migration target VM guest "Guest_b3" is "ON" here.

Accordingly, the migration type decision unit 39 transmits to the client apparatus 10 a screen in a state where the "Cold Migration" field and the "Live Migration" field have been activated as illustrated in FIG. 39.

The migration type decision unit 39 subsequently transmits to the client apparatus 10 a screen where "Guest_b3" is displayed in the "Live Migration" field as illustrated in FIG. 40 since the power status of the VM guest "Guest_b3" is "ON." In other words, in the state thus far, the migration management apparatus 30 has been decided to migrate "Guest_b2" that runs on the VM host "Host_b" to "Host_g" by "cold migration." Furthermore, the migration management apparatus 30 has been decided to migrate "Guest_c1" that runs on the VM host "Host_c" to "Host_a" by "live migration." Furthermore, the migration management apparatus 30 has been decided to migrate "Guest_b3" that runs on the VM host "Host_b" to "Host_g" by "live migration."

If the migration types of the VM guests are decided in this manner and then "OK" is clicked, the migration instruction unit 40 executes the migrations of the VM guests whose migration destinations and migration types have been decided. Specifically, the migration instruction unit 40 refers to the migration_lists variable, and transmits to the VM management apparatus an instruction to start the migrations of the VM guests displayed in the "Cold Migration" field and the "Live Migration" field. The VM management apparatus then transmits a migration instruction to each of the migration source VM hosts and the migration destination VM hosts. As a consequence, the VM hosts can execute migrations on the instructed VM guests.

Effects by Second Embodiment

According to the second embodiment, an arbitrary VM guest can be migrated to a plurality of VM hosts without paying attention to the loads of the VM host and the VM management apparatus. The migration management apparatus 30 transmits Web screens with contents of processes related to the migration of a VM guest to the client apparatus and accordingly the user can set a plurality of migrations with simple operations.

The migration management apparatus 30 can execute VM guest migration instructions all at once and accordingly the manager can shorten the bound time needed to execute the migration processes of VM guests including the settings of migration and the confirmation of a normal termination after the execution of migration. As a consequence, the manager can promote an improvement in work efficiency. Moreover, the whole migration process time can be shortened compared with the one-by-one-migration of VM guests, which leads to a reduction in the load on a server.

[C] Third Embodiment

The embodiments of the present invention have thus far been described. However, the present invention can be carried out in various different forms other than the above-mentioned embodiments. Hence, a different embodiment will be described below.

Web Screen

The example where the migration management apparatus 30 creates a Web screen and transmits the Web screen to the client apparatus 10 is described in the second embodiment. However, the present invention is not limited to this. For example, the migration management apparatus 30 may perform the display on the display unit 33 included in the apparatus itself, and accept operations of a user from a screen displayed on the display unit 33. Moreover, with regard to the result of the migration type and the like, the migration management apparatus 30 can accept drag and drop on an icon and accept the selection by the user.

Automatic Execution

For example, the migration management apparatus 30 can also decide a migration destination VM host and a migration type using information of the tables without creating a Web screen and asking a user. In other words, the migration management apparatus 30 identifies VM guests being migration targets from the tables. The migration management apparatus 30 then simulates the migrations of the VM guests to decide their respective migration destinations. Furthermore, the migration management apparatus 30 decides the migration modes of the VM guests whose migration destinations have been decided based on the power statuses of the VM guests. If the migration destinations and migration modes of the VM guests being migration targets are decided, the migration management apparatus 30 subsequently migrates the VM guests to their respective decided migration destinations in their respective decided migration modes.

In this manner, the migration management apparatus 30 can also execute all the processes automatically using the tables. Moreover, the migration management apparatus 30 may create, as Web screens, only part of the processes described in the second embodiment and the like such as a migration type decision result. In other words, the migration management apparatus 30 can not only decide a migration type and the like automatically but also accept specification from a user from a screen displayed on the client apparatus 10, and the like. In this case, the migration management apparatus 30 may give a high priority to an automatic decision or user specification by an instruction or setting of the manager or the like.

Migration Instruction Order

In the second embodiment, the example where cold migration is executed first and then live migration is executed is described. However, the order is not limited to this. For example, if a migration destination host and the like are specified by the manager or the like, it is possible to execute a migration to another migration destination after executing a migration to the specified migration destination host. Therefore, the settings can be arbitrarily changed considering the load states of the migration destination host and the migration source host, the load state of the VM management apparatus, network availability, and the like.

System

Moreover, it is also possible to manually perform all or part of the processes described assuming to be performed automatically among the processes described in the embodiment. Alternatively, all or part of the processes described assuming to be performed manually can also be performed automatically in a known method. In addition, the processing procedure, control procedure, and specific names illustrated in the above document and drawings, and information including various data and parameters illustrated in, for example, FIGS. 3 to 12 can be arbitrarily changed unless otherwise specified.

Moreover, the illustrated components of the apparatuses are functionally conceptual, and are not necessarily needed to be physically configured as illustrated. In other words, specific forms of the distribution and integration of the apparatuses are not limited to the illustrations, for example, as in integrating the migration determination unit 38 and the migration type decision unit 39. In other words, all or part thereof can be configured by functional or physical distribution/integration in arbitrary units in accordance with various loads, use patterns, and the like. Furthermore, all or arbitrary part of the processing functions to be performed in the apparatuses can be realized by a CPU and a program to be analyzed and executed by the CPU, or realized by hardware by wired logic.

Program

The various processes described in the above embodiments can be realized by executing a program prepared in advance on a computer system such as a personal computer or a workstation. Hence, a description will be given below of an example of a computer system that executes a program having similar functions to the above embodiments.

Figure 41:
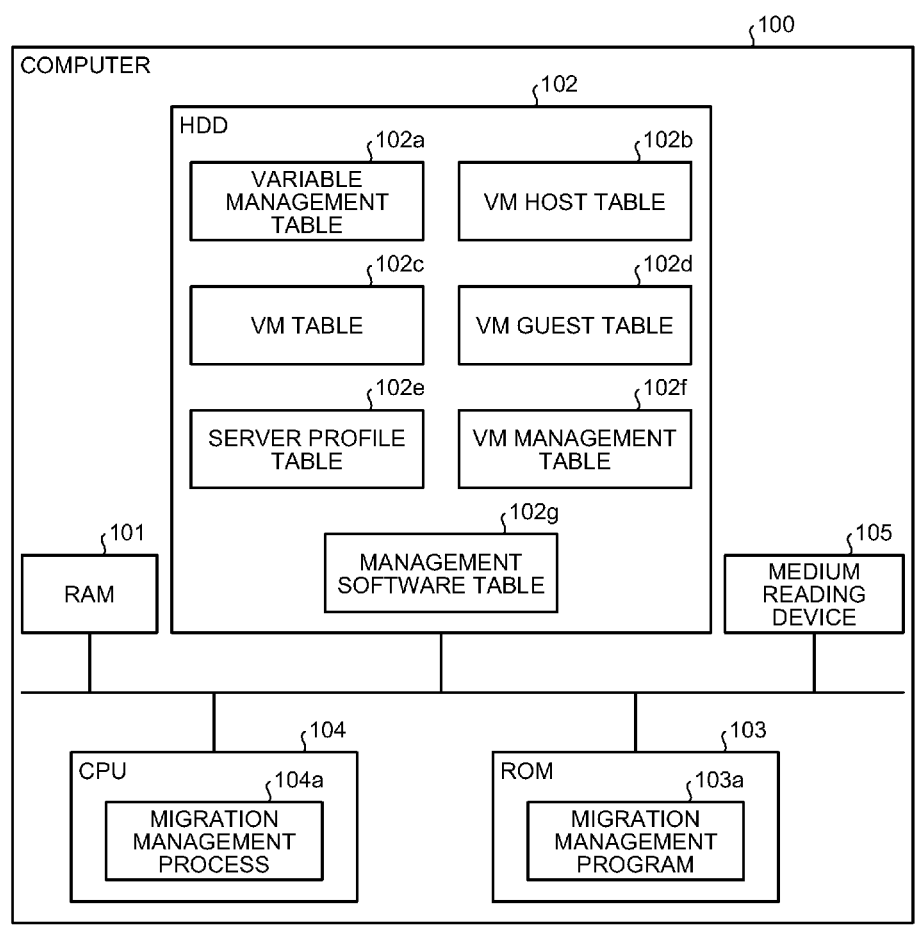
FIG. 41 is a diagram illustrating an example of a computer that executes a migration management program.

FIG. 41 is a diagram illustrating an example of a computer that executes a migration management program. As illustrated in FIG. 41, a computer 100 includes RAM 101, an HDD 102, ROM 103, a CPU 104, and a recording medium reading device 105. Tables having similar functions to the tables 34a to 34g illustrated in FIG. 2 are provided in the HDD 102. In other words, the HDD 102 is provided with a variable management table 102a, a VM host table 102b, a VM table 102c, a VM guest table 102d, a server profile table 102e, a VM management table 102f, and a management software table 102g.

A program that exerts similar functions to the above embodiments is previously stored in the ROM 103. In other words, as illustrated in FIG. 41, a migration management program 103a is previously stored in the ROM 103.

The CPU 104 reads and executes the migration management program 103a to execute a migration management process 104a as illustrated in FIG. 41. The migration management process 104a executes similar operations to the control units illustrated in FIG. 2. In other words, the migration management process 104a executes similar operations as the VM host creation unit 35, the VM guest candidate creation unit 36, the migration destination candidate creation unit 37, the migration determination unit 38, the migration type decision unit 39, and the migration instruction unit 40.

The migration management program 103a is not necessarily needed to be stored in the ROM 103. The migration management program 103a may be stored in a "portable physical medium" such as a flexible disk (FD), a CD-ROM, a DVD disk, a magneto-optical disk, or an IC card that is inserted into the computer 100. Moreover, the migration management program 103a may be stored in a "fixed physical medium" such as a hard disk drive (HDD) included inside or outside the computer 100. Furthermore, the migration management program 103a may be stored in "another computer" to be connected to the computer 100 via a public network, the Internet, a LAN, a WAN, or the like. The computer 100 may read the program from them and execute the program.

In other words, the program referred to in the different embodiment is one to be recorded in a computer-readable manner in a recording medium such as the above "portable physical medium," "fixed physical medium," and "communication medium." For example, the computer 100 can also realize similar functions to the above embodiments by reading the migration management program from a recording medium with the recording medium reading device 105, and executing the read migration management program. The program referred to in the different embodiment is not limited to being executed by the computer 100. For example, the present invention can be similarly applied when another computer or server executes the program or when they execute the program in cooperation.

According to one aspect of an embodiment, the working time of a migration process of a virtual machine can be shortened.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A migration management apparatus comprising:
a memory; and
a processor that is connected to the memory, wherein the processor executes a process including:
first deciding, using information associated with resources that are used by a plurality of virtual machines being migration targets, a physical machine which has the resources as a migration destination, wherein the migration destination has a same type of management software as a physical machine hosting the migration targets;
determining, with respect to the migration destination, whether a migration of a plurality of virtual machines is to be executed in parallel or individually based on the first deciding of the type of the management software which operates a virtual machine on the migration destination, wherein the plurality of virtual machines are migrated in parallel if the type of the management software supports a plurality of migrations in parallel;
second deciding each of migration modes of the plurality of virtual machines whose migration destination has been decided at the first deciding based on each of power status of the plurality of virtual machines, wherein the second deciding includes deciding the migration mode of a virtual machine to be a live migration for the virtual machine of which the power status is active and deciding the migration mode of a virtual machine to be a cold migration for the virtual machine of which the power status is inactive; and
when the migration destination and each of migration modes of the plurality of virtual machines being the migration targets are decided based on the first deciding and the second deciding, migrating the plurality of virtual machines to the migration destination using each of migration modes in parallel or individually based on a result which is determined at the determining.

2. The migration management apparatus according to claim 1,
wherein the first deciding includes identifying a plurality of physical machines which have the resources as migration destination candidates and deciding the migration destination from among the migration destination candidates.

3. The migration management apparatus according to claim 1, wherein the first deciding includes deciding virtual machines whose power statuses are active or inactive as migration target candidates among virtual machines running on servers, and setting the virtual machine which is specified by a user among the detected migration target candidates as the migration target.

4. The migration management apparatus according to claim 2, wherein the determining includes identifying a migration destination candidate which executes the software which executes the migration of the plurality of virtual machines in parallel from among the migration destination candidates and deciding the detected migration destination candidate as the migration destination.

5. The migration management apparatus according to claim 2, wherein the determining includes identifying, among the migration destination candidates, a migration destination candidate which executes the software which executes the migration of the plurality of virtual machines in parallel and which has a total of the resources that are used by the plurality of virtual machines being the migration targets and deciding the detected migration destination candidate as the migration destination.

6. The migration management apparatus according to claim 1, wherein when the migration mode of each virtual machine has been specified, the migrating includes migrating using the specified migration mode irrespective of the power status.

7. The migration management apparatus according to claim 1, wherein when migrating the virtual machines, the migrating includes executing a migration by a cold migration first, and executing a migration by a live migration after the completion of the migration of the virtual machine by the cold migration.

8. A migration management method being a control method to be executed by a computer, comprising:
first deciding, using information associated with resources that are used by a plurality of virtual machines being migration targets, a physical machine which has the resources as a migration destination, wherein the migration destination has a same type of management software as a physical machine hosting the migration targets;
determining, with respect to the migration destination, whether a migration of a plurality of virtual machines is to be executed in parallel or individually based on the first deciding of the type of the management software which operates a virtual machine on the migration destination, wherein the plurality of virtual machines are migrated in parallel if the type of the management software supports a plurality of migrations in parallel;
second deciding each of migration modes of the plurality of virtual machines whose migration destination has been decided at the first deciding based on each of power status of the plurality of virtual machines, wherein the second deciding includes deciding the migration mode of a virtual machine to be a live migration for the virtual machine of which the power status is active and deciding the migration mode of a virtual machine to be a cold migration for the virtual machine of which the power status is inactive; and
when the migration destination and each of migration modes of the plurality of virtual machines being the migration targets are decided based on the first deciding and the second deciding, migrating the plurality of virtual machines to the migration destination using each of migration modes in parallel or individually based on a result which is determined at the determining.

9. A non-transitory computer-readable recording medium having stored therein a migration management program to cause a computer to execute a process comprising:
first deciding, using information associated with resources that are used by a plurality of virtual machines being migration targets, a physical machine which has the resources as a migration destination, wherein the migration destination has a same type of management software as a physical machine hosting the migration targets;
determining, with respect to the migration destination, whether a migration of a plurality of virtual machines is to be executed in parallel or individually based on the first deciding of the type of the management software which operates a virtual machine on the migration destination, wherein the plurality of virtual machines are migrated in parallel if the type of the management software supports a plurality of migrations in parallel;

second deciding each of migration modes of the plurality of virtual machines whose migration destination has been decided at the deciding based on each of power status of the plurality of virtual machines, wherein the second deciding includes deciding the migration mode of a virtual machine to be a live migration for the virtual machine of which the power status is active and deciding the migration mode of a virtual machine to be a cold migration for the virtual machine of which the power status is inactive; and when the migration destination and each of migration modes of the plurality of virtual machines being the migration targets are decided based on the first deciding and the second deciding, migrating the plurality of virtual machines to the migration destination using each of migration modes in parallel or individually based on a result which is determined at the determining.

* * * * *